US011907664B1

(12) United States Patent
Tobey et al.

(10) Patent No.: US 11,907,664 B1
(45) Date of Patent: Feb. 20, 2024

(54) COMPUTER-BASED SYSTEMS INVOLVING MACHINE LEARNING ASSOCIATED WITH GENERATION OF PREDICTIVE CONTENT FOR DATA STRUCTURE SEGMENTS AND METHODS OF USE THEREOF

(71) Applicant: Capital One Services, LLC, McLean, VA (US)

(72) Inventors: David Tobey, Brooklyn, NY (US); Kamalesh Jayaraman, Fairfax, VA (US); Jagdeep Kalra, Herndon, VA (US)

(73) Assignee: Capital One Services, LLC, McLean, VA (US)

( * ) Notice: Subject to any disclaimer, the term of this patent is extended or adjusted under 35 U.S.C. 154(b) by 351 days.

(21) Appl. No.: 17/245,680

(22) Filed: Apr. 30, 2021

(51) Int. Cl.
*G06F 40/30* (2020.01)
*H04L 51/046* (2022.01)
*G06N 5/04* (2023.01)
*G06N 20/00* (2019.01)
*G06F 40/166* (2020.01)

(52) U.S. Cl.
CPC ............ *G06F 40/30* (2020.01); *G06F 40/166* (2020.01); *G06N 5/04* (2013.01); *G06N 20/00* (2019.01); *H04L 51/046* (2013.01)

(58) Field of Classification Search
None
See application file for complete search history.

(56) References Cited

U.S. PATENT DOCUMENTS

| 11,516,158 | B1 | 11/2022 | Luzhnica et al. | |
|---|---|---|---|---|
| 2008/0201731 | A1* | 8/2008 | Howcroft | H04N 21/466 348/E7.071 |
| 2011/0202512 | A1* | 8/2011 | Pantanelli | G06F 40/247 707/706 |
| 2012/0005008 | A1 | 1/2012 | Ramer et al. | |
| 2014/0129331 | A1 | 5/2014 | Spivack et al. | |

(Continued)

OTHER PUBLICATIONS

International Search Report and Written Opinion from International Application No. PCT/US2022/027173 dated Jul. 25, 2022.

(Continued)

*Primary Examiner* — Quynh H Nguyen
(74) *Attorney, Agent, or Firm* — Greenberg Traurig, LLP

(57) ABSTRACT

Systems and methods associated with generation and/or provision of predictive content are disclosed. One exemplary method includes receiving communications associated with a plurality of customers; determining a message type for each message of the communications; splitting first messages of the first message type into a first set of subcomponent text sections; splitting second messages of the second message type into a second set of subcomponent text sections; analyzing the first set and the second set to generate a plurality of semantic numerical scores for each respective subcomponent text section; determining at least one impactful semantic category for a target audience by selecting at least one semantic category corresponding to at least one semantic numerical score of at least one subcomponent text section of the first set or the second set that is equal to or higher than a first pre-determined threshold value; generating personalized textual content targeting the audience.

20 Claims, 21 Drawing Sheets

(56) References Cited

U.S. PATENT DOCUMENTS

| | | |
|---|---|---|
| 2016/0132483 A1 | 5/2016 | Chelst et al. |
| 2019/0034976 A1 | 1/2019 | Hamedi et al. |
| 2020/0032057 A1 | 10/2020 | Singh et al. |
| 2022/0405805 A1 | 12/2022 | Khoury et al. |

OTHER PUBLICATIONS

Office Action dated Jun. 23, 2023, in U.S. Appl. No. 17/245,742 (15 pgs).

\* cited by examiner

Personalization - Strategy

Knowing More About the Users

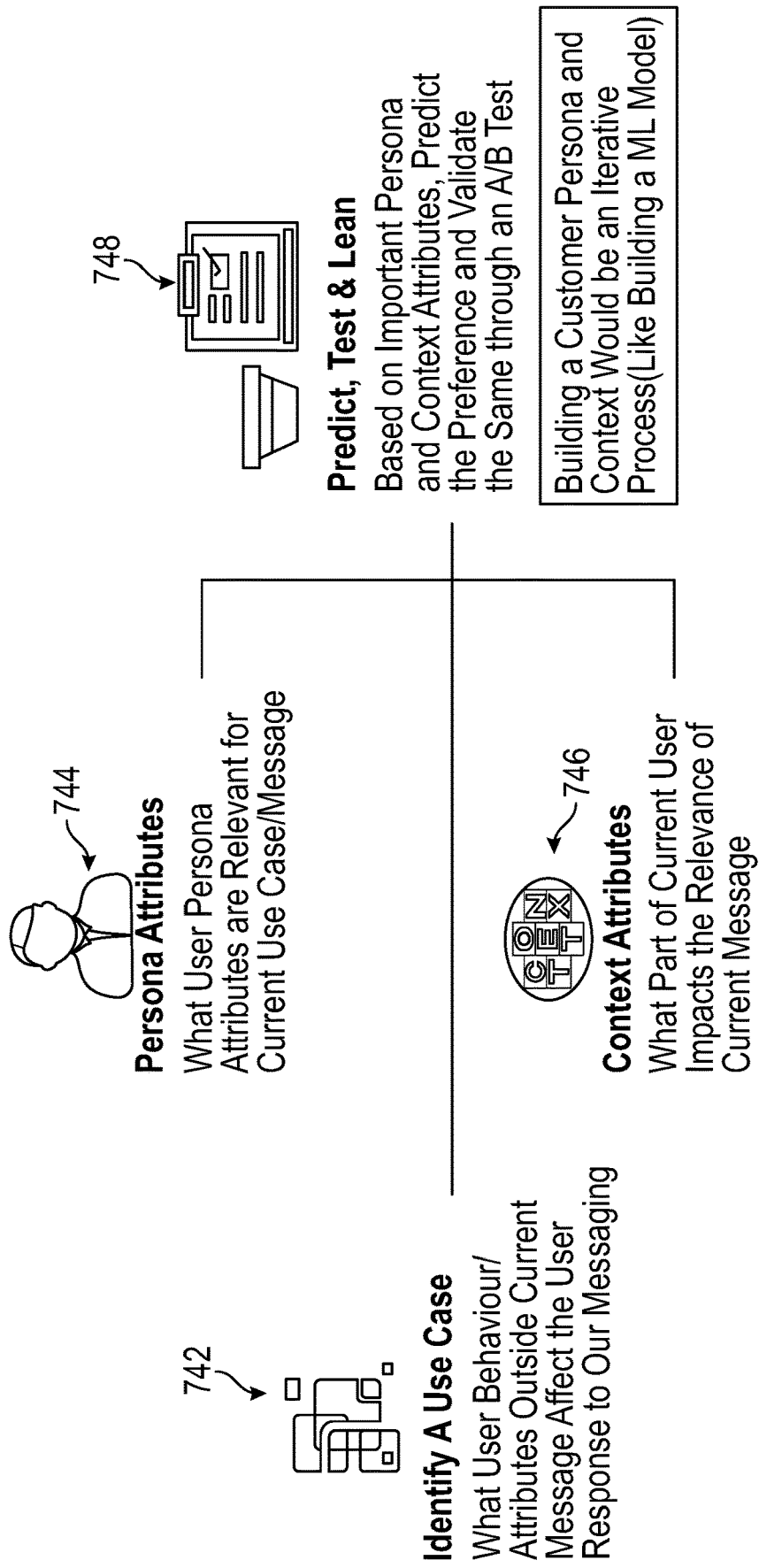

Time Personalization

COMPUTER-BASED SYSTEMS INVOLVING MACHINE LEARNING ASSOCIATED WITH GENERATION OF PREDICTIVE CONTENT FOR DATA STRUCTURE SEGMENTS AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to an improved computer-based platform or system, improved computing components and devices and/or improved computing methods configured for one or more novel technological applications involving machine learning engine(s) including features and functionality associated with generating predictive content.

BACKGROUND OF TECHNOLOGY

A computer network platform or system may include a group of computers (e.g., clients, servers, smart routers, etc.) and other computing hardware devices that are linked together through one or more communication channels to facilitate communications, marketing, and/or customer service or customer relations activities. For example, a computer network platform or system may provide a customer at a client device with various content, information and/or service(s) from a service and/or product provider associated with a server system, over one or more communication channels or networks, e.g., via media such as emails, SMS, telephonic calls, social media messages, push messages, display of banner at a web browser of the customer, and the like.

SUMMARY OF DESCRIBED SUBJECT MATTER

In some embodiments, the present disclosure provides various exemplary computer-implemented methods involving machine learning techniques associated with generating predictive content, including a method having steps such as:
  receiving, by at least one processor, communications associated with a plurality of customers, the communications comprised of customer messages;
  determining a message type, from among a plurality of message types, for each message of the communications, wherein the plurality of message types comprises a first message type and a second message type;
  splitting, by the at least one processor, first messages of the first message type into a first set of subcomponent text sections;
  splitting, by the at least one processor, second messages of the second message type into a second set of subcomponent text sections;
  analyzing, by the at least one processor, the first set and the second set to generate a plurality of semantic numerical scores for each respective subcomponent text section, wherein each respective semantic numerical score is based on an evaluation of each respective subcomponent text section in a respective semantic category of a plurality of semantic categories, wherein the plurality of the semantic categories comprises at least three semantic categories are selected from a sentiment category, an emotion category, a perceived message type category, a semantic relatedness category, a feeling category, a tone category, a perception category, a micro structure category, and an emotional intelligence category;
  determining, by the at least one processor, at least one impactful semantic category for a target audience by selecting at least one semantic category corresponding to at least one semantic numerical score of at least one subcomponent text section of the first set or the second set that is equal to or higher than a first pre-determined threshold value;
  generating, by the at least one processor, personalized textual content targeting the audience based on at least one unit of text having a corresponding semantic numerical score in the at least one impactful semantic category that is equal to or higher than a second pre-determined threshold value;
  generating, by the processor, at least one personalized communication for transmission to the audience from the personalized textual content.

In some embodiments, the present disclosure also provides exemplary technically improved computer-based systems and computer-readable media, including media implemented with and/or involving one or more software applications, whether resident on computer devices or platforms, provided for download via a server and/or executed in connection with at least one network such as via a web application, that include or involves features, functionality, computing components and/or steps consistent with any set forth herein.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIGS. 7A-7F are schematic diagrams illustrating various features associated with aspects of generating predictive content, consistent with certain embodiments of the present disclosure.

DETAILED DESCRIPTION

Figure 1:
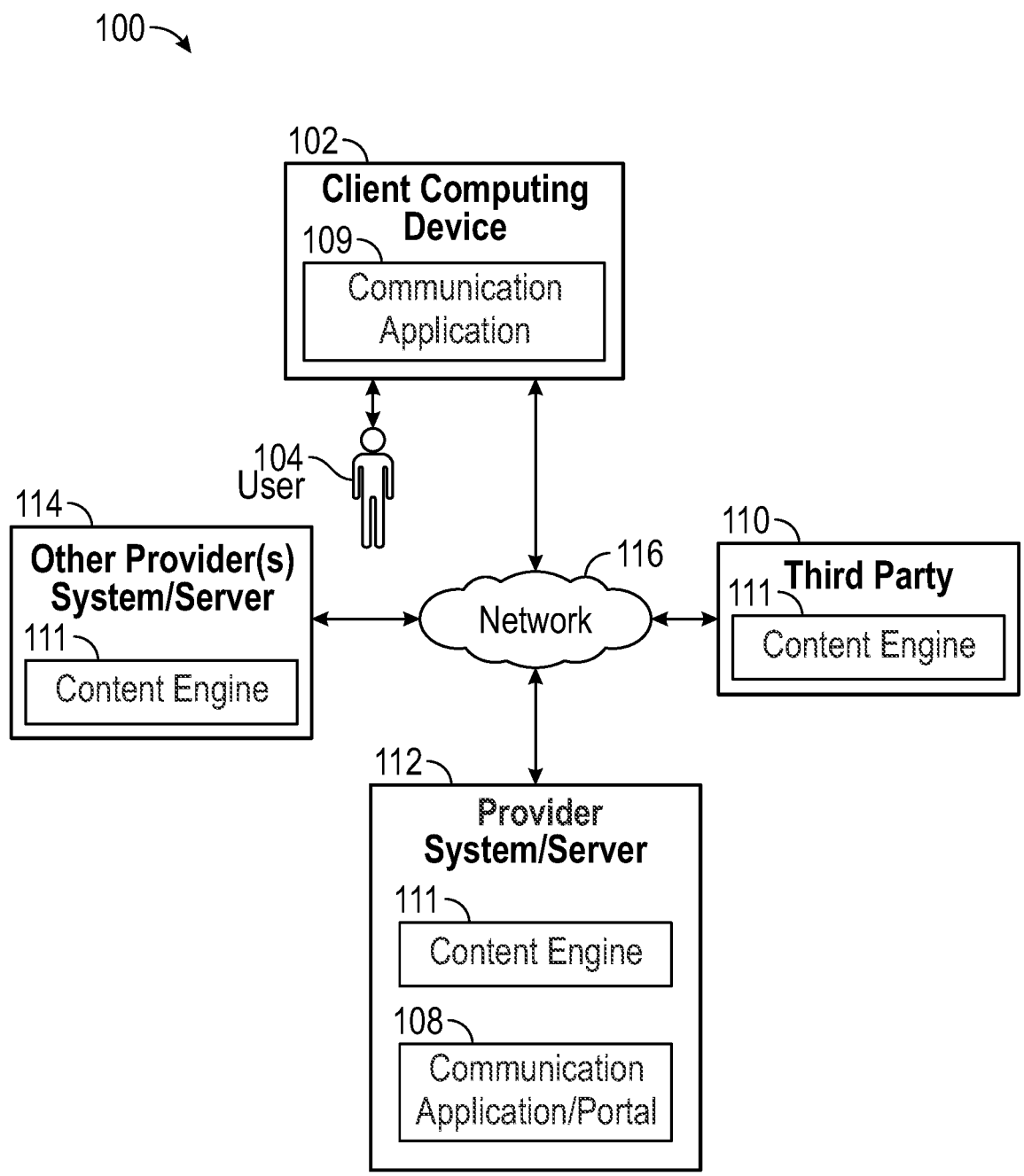
FIG. 1 is a block diagram of an exemplary system and/or platform involving aspects of predictive content generation, consistent with certain embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

Aspects of the present innovations relate to generating predictive content and may include or involve content analyzing and audience prediction features that enable a provider, such as a content provider, a service provider, a product provider, etc., to enhance its customer communications with more relevant and engaging information, such as text and/or content that is personalized and contextualized based on an individual customer's needs and preferences. To deliver more personally relevant and engaging communications, such provider may generate communications, in connection with the machine learning aspects herein, that better its performance and productivities on various fronts such as higher customer satisfaction, more efficient and effective marketing campaigns, higher customer conversion rate, higher customer loyalty, and resultant higher revenue and profits.

Further, aspects of the innovations herein may involve various technical solutions associated with content analyzing and audience preference prediction, e.g., in aspects such as improving technological area of electronic recommendation generation in a form of an exemplary specifically configured content personalization agent/engine which may be configured to, for example, without limitation, collect user persona data/user context data, manage user personal data/context data, generate and/or train machine learning models for content analyzation and/or audience predication, as well as in other areas, such as cross-opportunity modeling, that encompass the learning gained from individual models.

Turning to how a provider may generate and send an intelligent and impactful message to a customer, the provider may employ a content personalization engine associated with predicting and generating personalized content for transmission to the customer. Such content personalization engine may in turn employ a content analyzer for analyzing information revealing how the provider may personalize a message and content for a customer, and an audience predictor for determining the customer preferences including the likelihood of that the message to engage the customer.

FIG. 1 is a block diagram of an exemplary system and/or platform involving aspects of predictive content generation, consistent with certain embodiments of the present disclosure. System 100 may be configured for executing one or more software applications, such as a communication application/portal 108 for receiving and transmitting messages (e.g., emails, telephonic calls, SMS, social media messages, etc.), and an associated content personalization engine, consistent with disclosed embodiments. As shown, system 100 may include a computing device 102, such as a client computing device, associated with a user 104. Computing device 102 may be configured to execute, among other programs, a communication application 109. System 100 may further include a third-party computer or system 110 such as an entity that provides an engine 111 involved with generation of predictive content ("content engine"), other provider system/server 114, such as a system or server of other provider systems or servers that may also have or share processing for a content engine 111, a provider system or server 112 (provider system/server") that may also access, provide and/or employ such a content personalization engine 111. As shown, computing device 102, third party 110, other provider(s) system/server 114, and provider system/server 112, may be communicatively coupled by a network 116.

While only one computing device 102, third party 110, other provider system/server 114, provider system/server 112, and network 116 are shown, it will be understood that system 100 may include more than one of any of these components. More generally, the components and arrangement of the components included in system 100 may vary. Thus, system 100 may include other components that perform or assist in the performance of one or more processes consistent with the disclosed embodiments. Computing device 102 may be one or more computing devices configured to perform operations consistent with executing the communication application.

Communication application/portal 108 may be one or more software applications configured to perform operations consistent with providing communication in various forms to the user 104, accessing the portal (via network or online), as set forth herein, as well as interacting with the communication application 109, and the like. Here, for example, communication application 108 may be configured to provide various information and processing, associated with communicating by the user with the provider system/server 112, the third-party provider 110, and/or the other provider system/server 114. Such processing may occur by or with a communication application 108, locally, or the communication application 108 may transmit requests to and/or operate with one or more other software applications and/or computing components to process the desired information. Communication application 108 may also be hosted and/or operated, in whole or in part, by a network/web system and/or server, described below in connection with FIG. 2.

Content personalization engine 111 may be one or more software applications, modules, routines, subroutines and/or extensions, including machine learning, configured to perform operations consistent with providing content personalization for use by the communication application/portal 108, such as the features and functionality associated with the generation of predictive content shown and discussed further in connection with FIGS. 8-15.

Third party 110 may be an entity associated with one or more computing devices that are being operated to provide the content personalization service as a third-party provider (e.g., software as a service, etc.). However, the content personalization engine 111 may also be provided internally by an entity wishing to provide personalized content to customers, such as by provider system/server 112 and/or the other provider system/server 114, and the like.

Other provider system or server 114 may be one or more computing devices configured to perform operations consistent with providing a content engine 111 to users or customers including features and functionality accessible by computing device 102 over network 116. For example, various communication channels may be provided at computing device 102 via the communication application 108. The disclosed embodiments are not limited to any particular configuration of other provider system/server 114.

According to some embodiments, provider system/server 112 may be associated with a financial service entity that provides, maintains, manages, or otherwise offers financial services. For example, the financial service entity may be a bank, credit card issuer, or any other type of financial service entity that generates, provides, manages, and/or maintains financial service accounts for one or more customers. Financial service accounts may include, for example, credit card accounts, loan accounts, checking accounts, savings accounts, reward or loyalty program accounts, and/or any other type of financial service account known to those skilled in the art.

Network 116 may be any type of network configured to provide communication between components of system 100. For example, network 116 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 100. In other embodiments, one or more components of system 100 may communicate directly through a dedicated communication link(s).

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
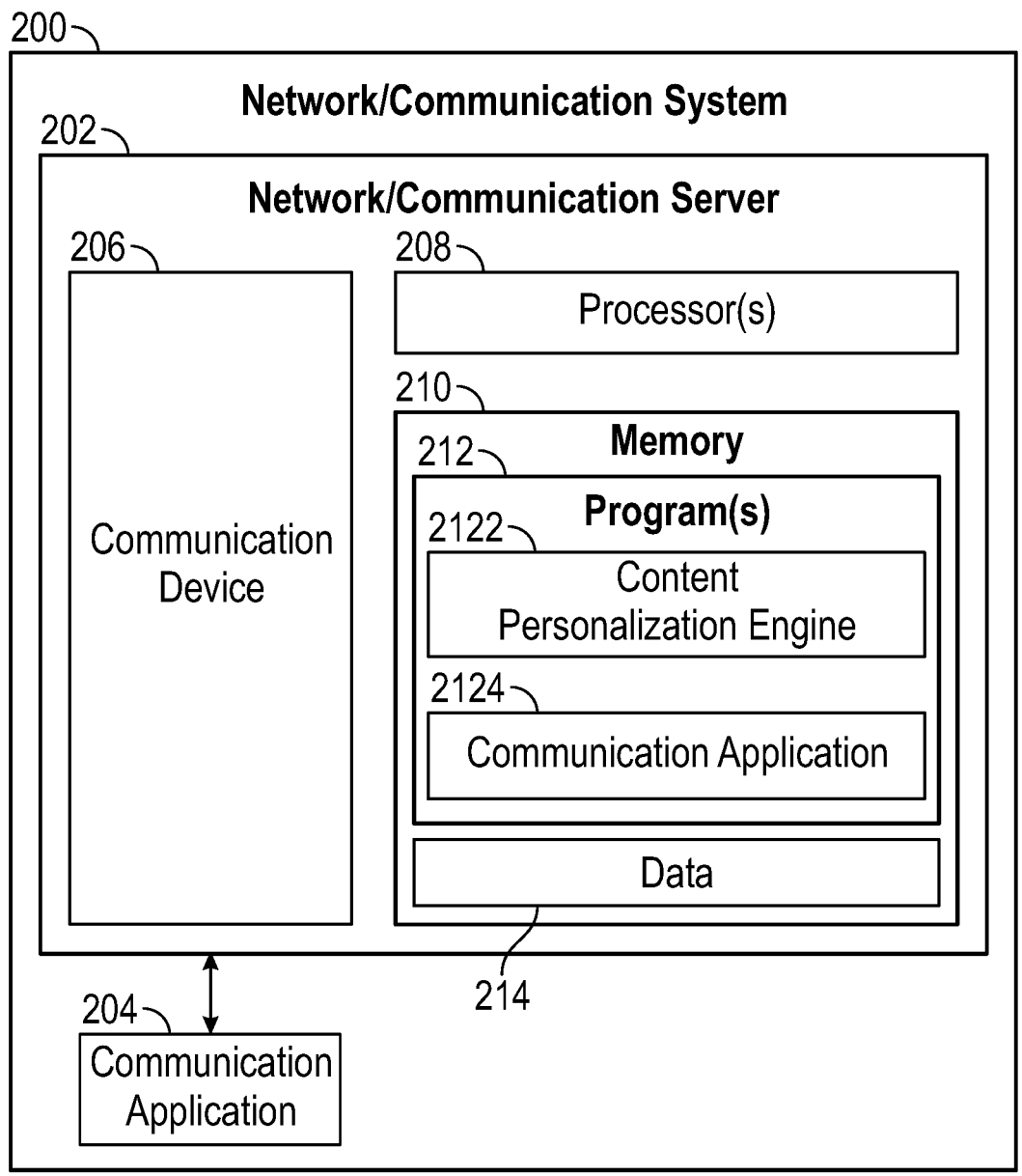
FIG. 2 is another block diagram of an exemplary system and/or platform involving aspects of predictive content generation, consistent with certain embodiments of the present disclosure.

FIG. 2 is a block diagram of an exemplary network/communication system 200 involving features of predictive content generation, consistent with exemplary aspects of at least some embodiments of the present disclosure. As shown, network/communication system 200 may include network/communication server 202, and communication application 204. Network/communication server 202 may include a communication device 206, one or more processor(s) 208, and memory 210 including one or more programs 212 and data 214. One or more programs 212 may include a communication application 216 and a content engine 218. Network/communication server 202 may be configured to perform operations consistent with providing features and functionality of the communication application 216 leveraging the functionalities of the content engine 218 over one or more networks, such as internet, intranet, the World Wide Web, etc.

Network/communication server 202 may take the form of a server, general purpose computer, mainframe computer, or any combination of these components. Other implementations consistent with disclosed embodiments are possible as well. Communication application 204 may take the form of one or more software applications stored on a computing device, such as communication application 108 stored on computing device 102 described in FIG. 1, above.

Communication device 206 may be configured to communicate with one or more computing devices, such as computing device 102. In some embodiments, communication device 206 may be configured to communicate with the computing device(s) through communication application 204. Network/communication server 202 may, for example, be configured to provide instructions and/or operating information to communication application 204 through communication device 206. Communication device 206 may be configured to communicate other information as well.

Communication device 206 may be further configured to communicate with one or more systems or servers, herein, such as the provider system/sever 112, other provider system/server 114, and/or third party 110 described above. Communication device 206 may be configured to communicate with such providers in other manners. Communication device 206 may be configured to communicate with other components as well.

Processor(s) 208 may include one or more known processing devices, such as a microprocessor from the Core™, Pentium™ or Xeon™ family manufactured by Intel®, the Turion™ family manufactured by AMD™, the "Ax" (i.e., A6 or A8 processors) or "Sx" (i.e. Si, . . . processors) family manufactured by Apple™, or any of various processors manufactured by Sun Microsystems, for example. The disclosed embodiments are not limited to any type of processor (s) otherwise configured to meet the computing demands required of different components of network/communication system 200.

Memory 210 may include one or more storage devices configured to store instructions used by processor(s) 208 to perform functions related to disclosed embodiments. For example, memory 210 may be configured with one or more software instructions, such as program(s) 212, that may perform one or more operations when executed by processor (s) 208. Such operations may include network/communication activities as well as creation and/or transmission of related network/communication attribute information. The disclosed embodiments are not limited to separate programs or computers configured to perform dedicated tasks. For example, memory 210 may include a single program 212 that performs the functions of network/communication system 200, or program(s) 212 may comprise multiple programs. Memory 210 may also store data 214 that is used by program(s) 212.

In certain embodiments, memory 210 may store one or more sets of instructions involved with carrying out the processes described below, such as those of FIGS. 5A-6 and FIGS. 3-15. Other instructions are possible as well. In general, instructions may be executed by processor(s) 208 to perform one or more processes consistent with disclosed embodiments.

The components of network/communication system 200 may be implemented in hardware, software, or a combination of both hardware and software, as will be apparent to those skilled in the art. For example, although one or more components of network/communication system 200 may be implemented as computer processing instructions, all or a portion of the functionality of network/communication system 200 may be implemented instead in dedicated electronics hardware. In some embodiments, network/communication system 200 may also be communicatively connected to one or more database(s) (not shown). Alternatively, such database(s) may be located remotely from network/communication system 200.

Network/communication system 200 may be communicatively connected to such database(s) through a network, such as network 116 described above. Such database(s) may include one or more memory devices that store information and are accessed and/or managed through network/communication system 200. By way of example, such database(s) may include Oracle™ databases, Sybase™ databases, or other relational databases or non-relational databases, such as Hadoop sequence files, HBase, or Cassandra. Such database(s) may include computing components (e.g., database management system, database server, etc.) configured to receive and process requests for data stored in memory devices of the database(s) and to provide data to the database (s).

Figure 3:
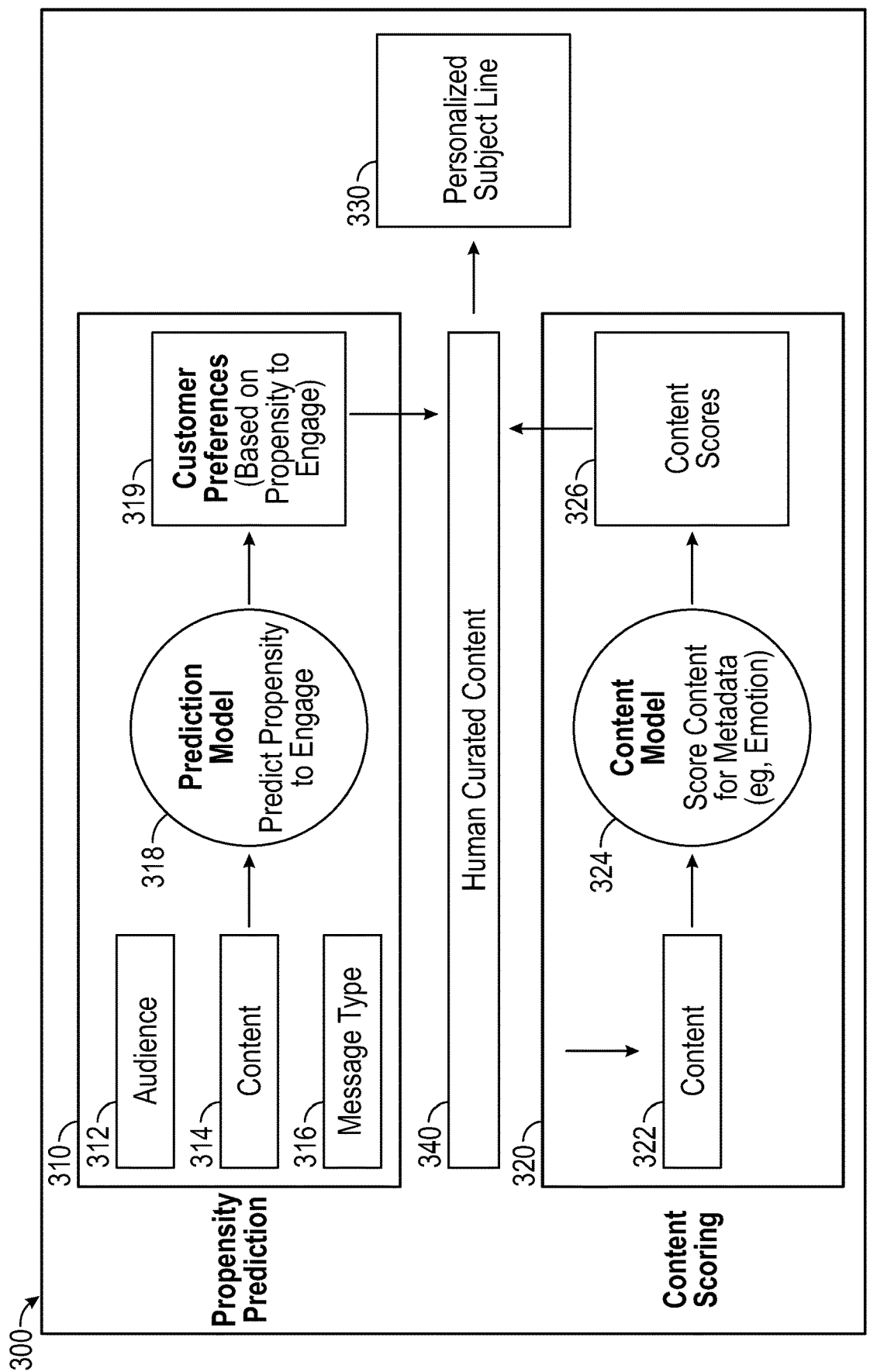
FIG. 3 is a diagram depicting exemplary aspects and flow of illustrative predictive content generation engine, consistent with certain embodiments of the present disclosure.

FIG. 3 is a diagram depicting exemplary aspects and flow of illustrative predictive content generation engine, consistent with certain embodiments of the present disclosure. As shown in the exemplary diagram and architecture of FIG. 3, an illustrative content personalization engine 300 may involve a customer/audience predictor 310 and a content analyzer 320 to generate a personalized subject line 330 (or other content), which may be used, for example, when sending item(s) of human curated content 340 or other content. The customer predictor 310 operates to receive input such as audience data 312, content data 314, and message type data 316, which is in turn provided to a prediction model 318 to generate customer preferences 319. In some embodiments, customer preferences 319 may include information regarding a customer's likelihood of engagement (e.g., propensity prediction), a customer's preferred time/schedule for accessing his or her messages, and a customer's preferred channel of contact (e.g., emails, SMS, etc.), among other such communication factors. The prediction model 318 may be trained by user data from the same customer, a group of similar customers, content personalization engine generated preferences (e.g., feedback data), or other suitable aggregation of customer data. Content analyzer 320 may be configured to receive input data such as sample data/content 322, which is in turn provided to a content model 324 to generate content scores 326. As set forth herein, the sample data/content 322 may be derived from prior communications from or associated with a target recipient or segment. In some embodiments, the sample data/content 322 can be an entire collection of the user data collected in the past. According to some aspects, the content model 324 may be configured for scoring content along a plurality of dimensions, for example, dimensions of various meta data such as emotion, sentiments, intent, and the like, as described in more detail, below. The content model 324 may be trained by user data from the same customer, a group of similar customers, content personalization engine generated content (e.g., feedback data), or other suitable aggregation of customer data. As set forth herein, as a function of the processing performed by the audience predicator 310 and the content analyzer 320, the content personalization engine 300 may be utilized in generating more personalized delivery of content such as human curated content 340, such as content from a marketing campaign, which may include generating a personalized subject line 330 and/or other content or communication packaging.

Figure 4:
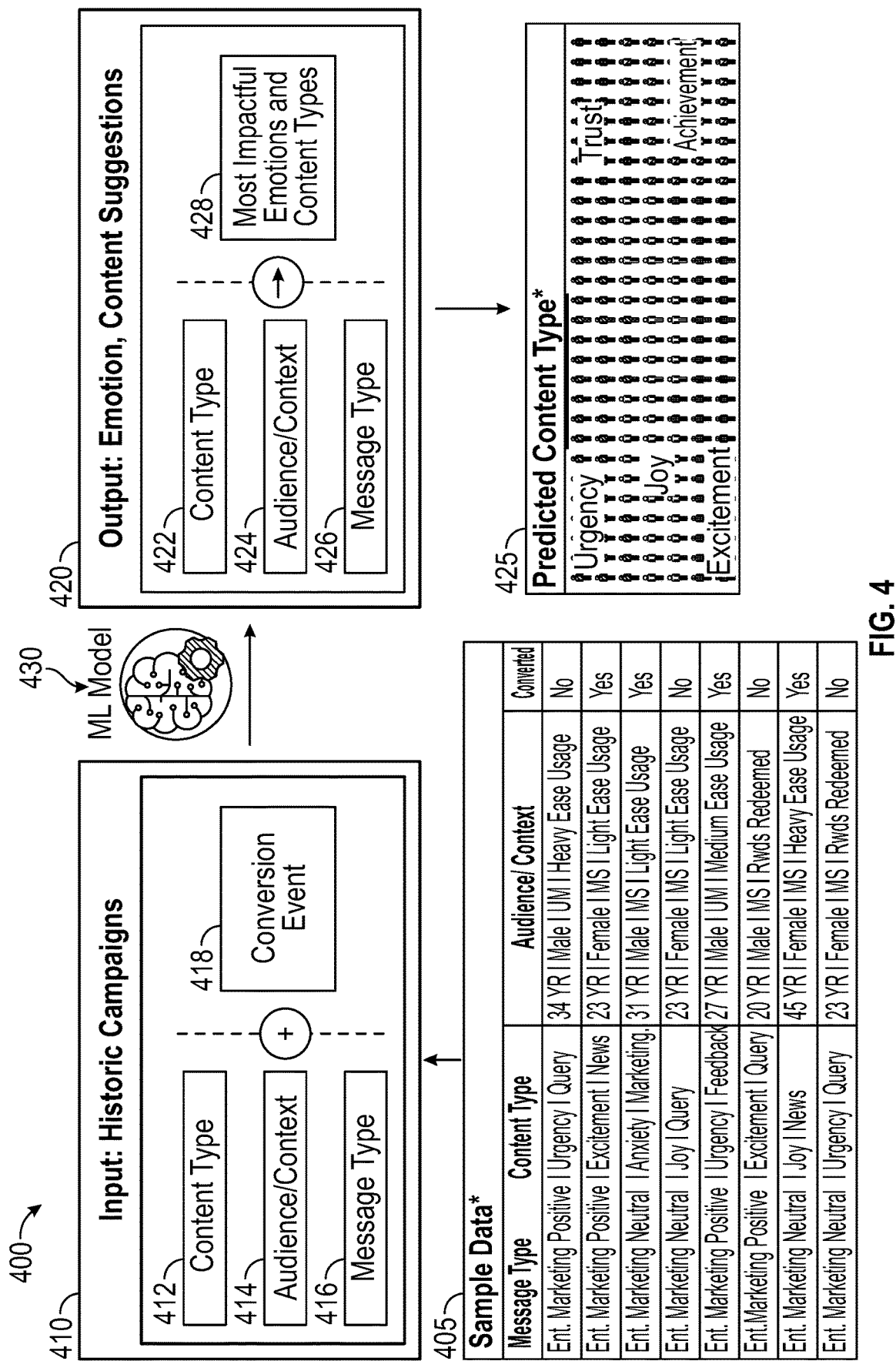
FIG. 4 is a diagram depicting exemplary aspects of illustrative audience predictor, consistent with certain embodiments of the present disclosure.

FIG. 4 is a diagram depicting exemplary aspects of illustrative audience predictor, consistent with certain embodiments of the present disclosure. As shown in the exemplary architecture of FIG. 4, an audience predictor 400 may comprises a input receiver or component 410, a machine learning model 430, and an output provider or component 420. The input receiver 410 is configured to intake sample data 405 provided to the audience predictor. In this example, the sample data 405 includes data from the past campaigns, including, for example, content type data 412, audience/context data 414, and message type data 416. In this example, the audience predictor 400 is further supplied with conversion event data 418, such as action by a user like opening a communication. In some embodiments, the message type data 416 can include information indicating whether a message is an enterprise marketing message. The content type data 412 can include information indicating a multi-factor description of the content, such as a three-factor semantic descriptions of the content of a message. For example, a content type may indicate "positive, joy, query," "positive, excitement, query," etc. More detail with regard to such content type(s) is described below with reference to FIGS. 5A-6. The audience/context data 414 can include information of customer profile data and the level of usage of a service/product. For example, the customer profile data can include demographic information such as the date of birth and gender of a customer. The conversion event data 418 can include information indicating whether the customer(s) targeted by the prior messages reacted or responded, e.g., when a user was successfully persuaded to open or otherwise act on (convert) such past communications. In other embodiment, the input receiver 410 can be configured to intake any types of data that is useful for the audience predictor 410 to create and train its prediction model 430 to generate predictions/recommendations.

On the output side, the output provider 420 of the audience predictor 400 may be configured to provide a set of one or more predictions regarding customer preferences and/or potential customer action. As shown herein, such predicted preferences include predictions regarding content type 422, predictions regarding audience/context 424, and/or predictions regarding message type 426. Based on the predicted customer preferences (e.g., customer intelligence), impactful meta data (e.g., emotion content) as well as impactful content 428 (e.g., an item of content that most likely is to engage a customer, an item of content that is of high interest to a customer at a particular context) may be determined, and subsequently used to generate a relevant and engaging message. As shown in FIG. 4, a matrix 425 of predicted content types is displayed, show examples of the types of content type categories that may be targeted, such as urgency, trust, joy, achievement, and excitement.

Figure 5A:
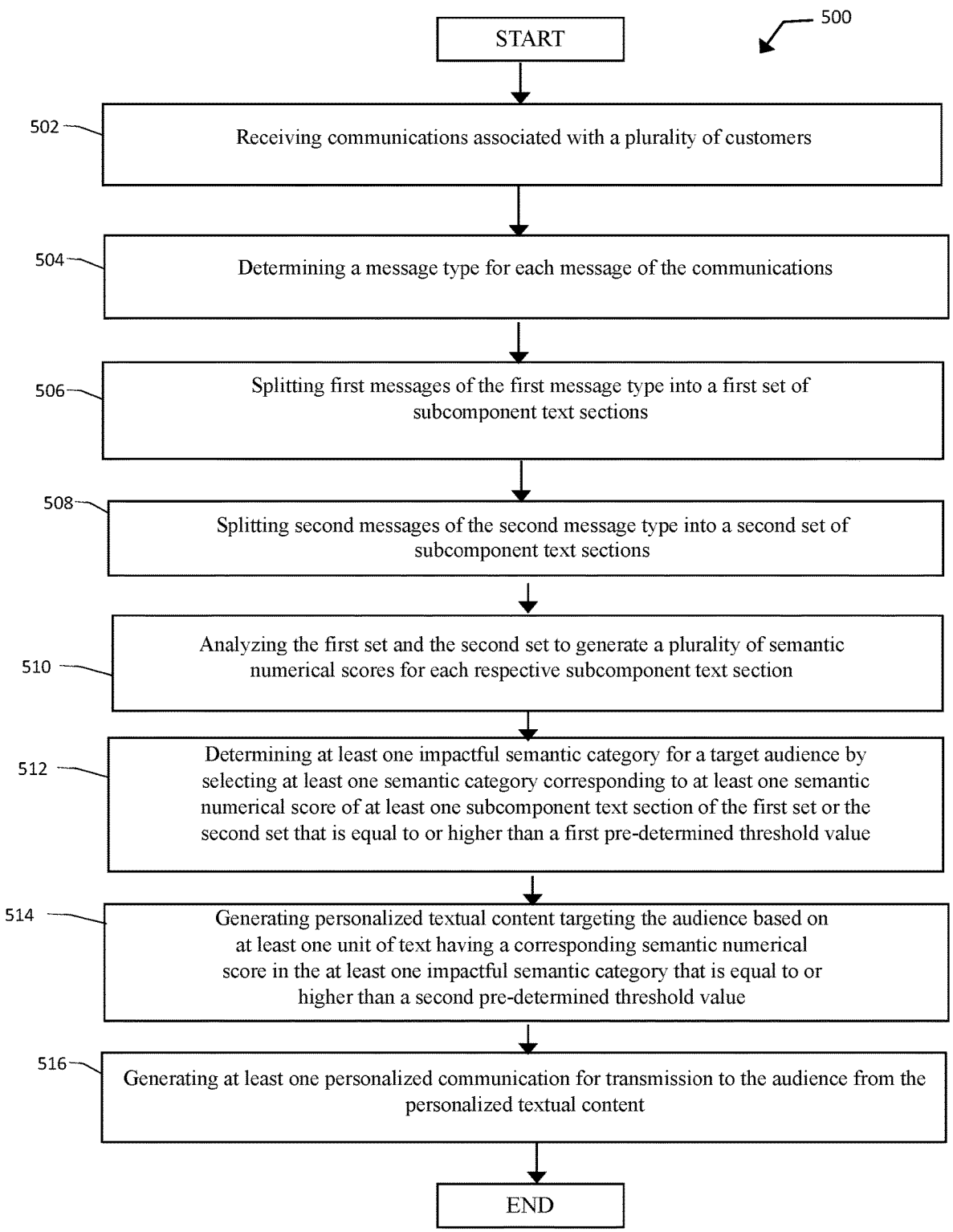
FIG. 5A is a flowchart illustrating one exemplary process related to generation of predictive content, consistent with certain embodiments of the present disclosure.

FIG. 5A is a flowchart illustrating one exemplary process 500 related to generation of predictive content, consistent with exemplary aspects of at least some embodiments of the present disclosure. As shown in the exemplary flowchart of FIG. 5A, an illustrative content generation process 500 may comprise: receiving communications associated with a plurality of customers, at 502; determining a message type for each message of the communications, at 504; splitting first messages of the first message type into a first set of subcomponent text sections, at 506; splitting second messages of the second message type into a second set of subcomponent text sections, at 404; analyzing the first set and the second set to generate a plurality of semantic numerical scores for each respective subcomponent text section, at 510; determining at least one impactful semantic category for a target audience by selecting at least one semantic category corresponding to at least one semantic numerical score of at least one subcomponent text section of the first set or the second set that is equal to or higher than a first pre-determined threshold value, at 512; generating personalized textual content targeting the audience based on at least one unit of text having a corresponding semantic numerical score in the at least one impactful semantic category that is equal to or higher than a second pre-determined threshold value, at 514; and generating at least one personalized communication for transmission to the audience from the personalized textual content, at 516. Further, the content generation process 500 may be carried out, in whole or in part, online, e.g., in connection with a content engine and/or it may be carried out by in conjunction with a messaging application functionality, described above.

In some embodiments, content generation process 500 may include, at 502, a step of receiving communications associated with a plurality of customers. With regard to the disclosed innovations, such communications may be comprised of customer messages. Here, for example, the customer messages may comprise messages communicated in prior marketing campaigns. Further, according to various embodiments, step 502 may be performed by at least one processor, such as a processor associated with at least one financial institution. Such financial institution may include a bank, credit card issuer, or any other type of financial service entity that generates, provides, manages, and/or maintains financial service accounts for one or more individuals, as well as conducts marketing campaigns reaching a targeted audience.

The content generation process 500 may include, at 504, a step of determining a message type for each message of the communications. Further, according to various disclosed embodiments, the message type is determined from among a plurality of message types, for each message of the communication. In some embodiments, the plurality of message types may comprise a first message type; and a second message type. Various implementations herein may be configured such that the first message type comprises emails; and/or the second message type comprises SMS messages, push messages, and web banners.

Content generation process 500 may include a step of splitting first messages of the first message type into a first set of subcomponent text sections, at 506; as well as a step of splitting second messages of the second message type into a second set of subcomponent text sections, at 508. In some embodiments, one or both of steps 506 and 508 may be performed by the at least one processor.

With regard to the first set of subcomponent text sections, implementations herein may be configured such that the first set of subcomponent text sections comprises 3 or more parts, including 3 or more of: a subject line; a preheader; a banner image; an introductory section; and/or a call to action. Moreover, particularly when the first message type comprises email messages, implementations herein may be configured such that the first set of subcomponent text sections comprises 3 or more parts. Here, for example, the 3 or more parts may include 3 or more of: a subject line; a preheader; a banner image; an introductory section; and/or a call to action.

With regard to the second set of subcomponent text sections, implementations herein may be configured such that the second set of subcomponent text sections comprises 2 or more parts, including 2 or more of: an introductory section; a body section; a value proposition; and/or an end section. Further, particularly when the second message type comprises 2 or more of: SMS messages; push messages; and/or web banners, implementations herein may be configured such that the second set of subcomponent text sections comprises 2 or more parts. Here, for example, the 2 or more parts may include 2 or more of: an introductory section; a body section; a value proposition; an end section; and/or entire message.

Content generation process 500 may include, at 510, a step of analyzing the first set and the second set to generate a plurality of semantic numerical scores for each respective subcomponent text section. In some embodiments, step 510 may be performed by the at least one processor. Further, according to various disclosed innovations, each respective semantic numerical score may be based on an evaluation of each respective subcomponent text section in a respective semantic category of a plurality of semantic categories. In one embodiment, the plurality of the semantic categories may comprise at least three semantic categories. Here, for example, the at least three sematic categories may be selected from a sentiment category, an emotion category, a perceived message type category, a semantic relatedness category, a feeling category, a tone category, a perception category, a micro structure category, and an emotional intelligence category.

Further, in some implementations, the sentiment category may be comprised of 2 or more subcategories selected from positive, neutral, and negative. In some other implementations, the emotion category may be comprised various subcategories selected from a group composed of boredom, anger, excitement, sadness, fear, joy, trust, pride, anticipation, anxiety, safety, urgency, luck, guilt, exclusivity, fascination, achievement, gratification, encouragement, intimacy, curiosity, gratitude, and challenge. Also in implementations, the perceived message type category may be comprised of 2 or more subcategories selected from a group composed of news, alerts, response/feedback, request for information, marketing, and spam.

Content generation process 500 may include, at 512, a step of determining at least one impactful semantic category for a target audience by selecting at least one semantic category corresponding to at least one semantic numerical score of at least one subcomponent text section of the first set or the second set that is equal to or higher than a first pre-determined threshold value. In various embodiments, step 512 may be performed by the at least one processor.

Content generation process 500 may include, at 514, a step of generating personalized textual content targeting the audience based on at least one unit of text having a corresponding semantic numerical score in the at least one impactful semantic category that is equal to or higher than a second pre-determined threshold value. In various embodiments, step 514 may be performed by the at least one processor. In implementations, the semantic numerical score in the semantic relatedness category may be set based on a percentage of the text that is determined to be semantically similar to a benchmark communication.

Content generation process 500 may also include, at 516, a step of generating at least one personalized communication for transmission to the audience from the personalized textual content. In various embodiments, step 516 may be performed by the at least one processor. According to various disclosed innovations, the at least one personalized communication may comprise a first portion of the personalized textual content that corresponds to the sentiment category determined to be impactful to the audience; a second portion of the personalized textual content that corresponds to the emotion category determined to be impactful to the audience; and a third portion of the personalized textual content that corresponds to the perceived message type category determined to be impactful to the audience.

According to some embodiments, methods herein may also comprise building a database of information regarding personalized messages that are impactful to each individual customer. In some implementations, the database may be built based on at least one prior personalized message that elicited a response from the individual customer.

According to some other embodiments, methods herein may also comprise one or both of: analyzing different textual components or text within at least one region of the at least one personalized communication to determine how the different textual component or text affect the semantic numerical scores; and/or changing (rearranging, replacing, deleting) the different textual portions or text within the at least one region of the at least one personalized communication, prior to sending to the audience, to generate a personalized communication that is determined to be potentially impactful to the audience via an increase in the semantic numerical score.

Figure 5B:
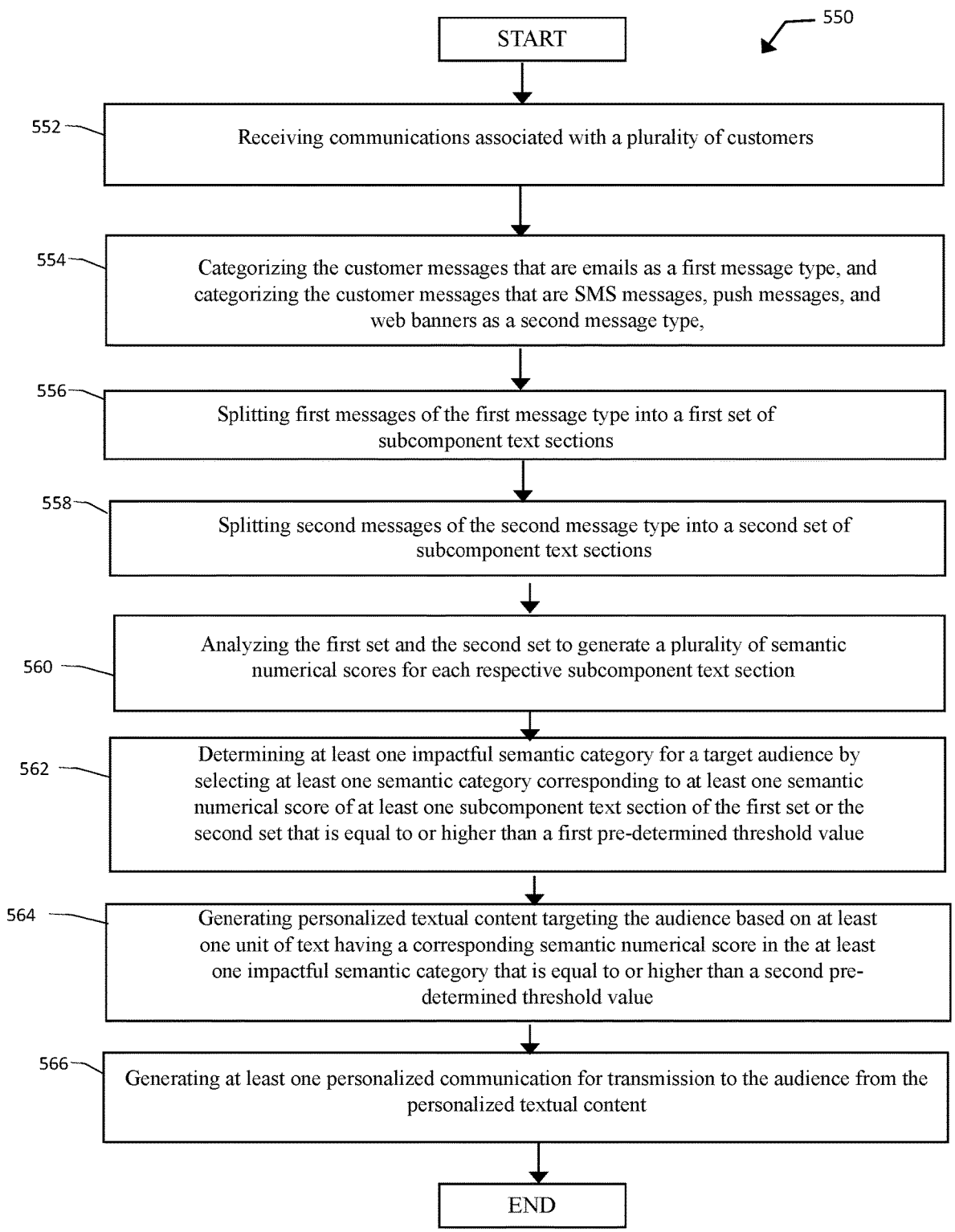
FIG. 5B is a flowchart illustrating another exemplary process related to generation of predictive content, consistent with certain embodiments of the present disclosure.

FIG. 5B is a flowchart illustrating another exemplary process 550 related to predictive content generation, consistent with exemplary aspects of at least some embodiments of the present disclosure. As shown in the exemplary flowchart of FIG. 5B, an illustrative content generation process 550 may comprise: receiving communications associated with a plurality of customers, at 552; categorizing the customer messages that are emails as a first message type, and categorizing the customer messages that are SMS messages, push messages, and web banners as a second message type, at 554; splitting first messages of the first message type into a first set of subcomponent text sections, at 556; splitting second messages of the second message type into a second set of subcomponent text sections, at 554; analyzing the first set and the second set to generate a plurality of semantic numerical scores for each respective subcomponent text section, at 560; determining at least one impactful semantic category for a target audience by selecting at least one semantic category corresponding to at least one semantic numerical score of at least one subcomponent text section of the first set or the second set that is equal to or higher than a first pre-determined threshold value, at 562; generating personalized textual content targeting the audience based on at least one unit of text having a corresponding semantic numerical score in the at least one impactful semantic category that is equal to or higher than a second pre-determined threshold value, at 564; and generating at least one personalized communication for transmission to the audience from the personalized textual content, at 566. Similarly, the content generation process 550 may be carried out, in whole or in part, online, e.g. via communication application/portal 108, etc., and/or it may be carried out by in conjunction with a messaging application functionality, such as being performed in connection with an email and/or social media messaging application.

In some embodiments, content generation process 550 may include, at 552, a step of receiving communications associated with a plurality of customers. In some embodiments, such communications may be comprised of customer messages. According to various embodiments, step 552 may be performed by at least one processor, such as a processor associated with at least one financial institution. Such financial institution may include a bank, credit card issuer, or any other type of financial service entity that generates, provides, manages, and/or maintains financial service accounts for one or more individuals, as well as conducts marketing campaigns reaching a target audience and/or customers.

The content generation process 550 may include, at 554, a step of categorizing the customer messages that are emails as a first message type, and categorizing the customer messages that are SMS messages, push messages, and web banners as a second message type.

The content generation process 550 may include, at 556, a step of splitting first messages of the first message type into a first set of subcomponent text sections; as well as a step of splitting second messages of the second message type into a second set of subcomponent text sections, at 554. In various embodiments, one or both of step 556 and step 554 may be performed by the at least one processor.

The content generation process 550 may include, at 560, a step of analyzing the first set and the second set to generate a plurality of semantic numerical scores for each respective subcomponent text section. According to various embodiments, step 560 may be performed via application of at least one machine learning algorithm. In some embodiments, step 560 may be performed by the at least one processor. Further, in some implementations, each respective semantic numerical score may be based on an evaluation of each respective subcomponent text section in a respective semantic category of a plurality of semantic categories. In other implementations, the plurality of the semantic categories may comprise at least three semantic categories are selected from: a sentiment category; an emotion category; a perceived message type category; a semantic relatedness category; a feeling category; a tone category; a perception category; a micro structure category; and/or an emotional intelligence category.

With regard to the first set of subcomponent text sections, implementations herein may be configured such that the first set of subcomponent text sections may comprise 3 or more parts, including 3 or more of: a subject line; a preheader; a banner image; an introductory section; and/or a call to action. Moreover, particularly when the first message type comprises email messages, implementations herein may be configured such that the first set of subcomponent text sections comprises 3 or more parts. Here, for example, such 3 or more parts may include 3 or more of: a subject line; a preheader; a banner image; an introductory section; and/or a call to action.

With regard to the second set of subcomponent text sections, implementations herein may be configured such that the second set of subcomponent text sections may comprise 2 or more parts, including 2 or more of: an introductory section; a body section; a value proposition; and/or an end section. Further, particularly when the second message type comprises 2 or more of: SMS messages; push messages; and/or web banners, implementations herein may be configured such that the second set of subcomponent text sections comprises 2 or more parts. Here, for example, such 2 or more parts may include 2 or more of: an introductory section; a body section; a value proposition; an end section; and/or entire message.

The content generation process 550 may include, at 562, a step of determining at least one impactful semantic category for a target audience by selecting at least one semantic category corresponding to at least one semantic numerical score of at least one subcomponent text section of the first set or the second set that is equal to or higher than a first pre-determined threshold value; at 566, a step of generating, personalized textual content targeting the audience based on at least one unit of text having a corresponding semantic numerical score in the at least one impactful semantic category that is equal to or higher than a second pre-determined threshold value; as well as a step of generating at least one personalized communication for transmission to the audience from the personalized textual content, at step 564. In various embodiments, one or more of step 564, step 566, and step 564 may be performed by the at least one processor.

Further, according to some implementations, the sentiment category may be comprised of 2 or more subcategories selected from positive, neutral, and negative. In some other implementations, the emotion category may be comprised of 3 or more subcategories selected from a group composed of happiness, concern, excitement, sadness, candor and boredom. In other implementations, the perceived message type category may be comprised of 2 or more subcategories selected from a group composed of news, feedback, query, marketing, and spam.

Figure 6:
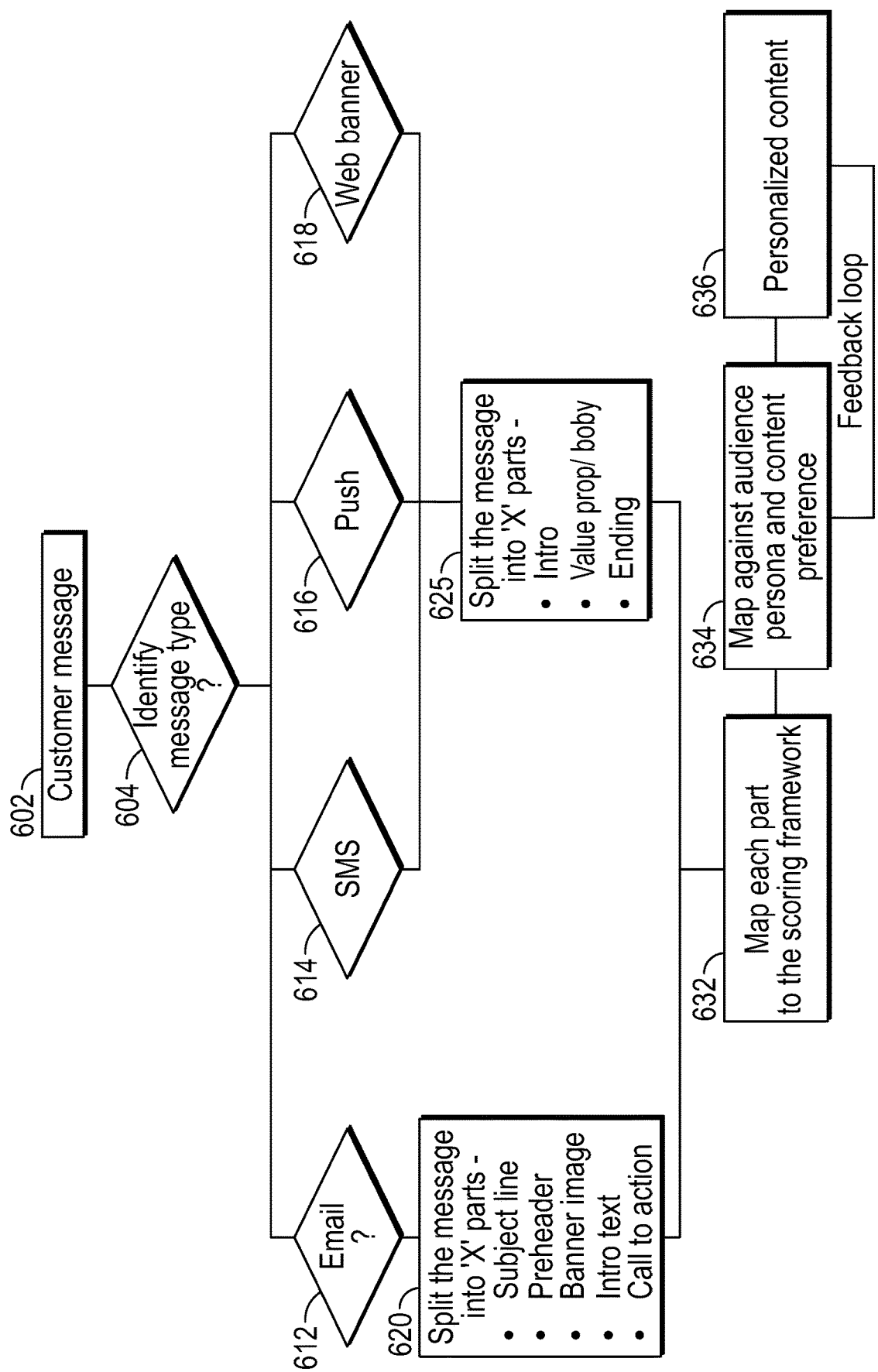
FIG. 6 is a flow diagram illustrating other exemplary features related to generating predictive content, consistent with certain embodiments of the present disclosure.

FIG. 6 is a flow diagram illustrating other exemplary features related to generating predictive content, consistent with certain embodiments of the present disclosure. As shown in the exemplary flowchart of FIG. 6, process 600 begins at step 602, at which one or more items of communication such as one or more customer messages are received. At 604, message types are determined for the messages received. In one embodiment, the message type is determined from a plurality of messages types including, for example, an email type 612, a SMS type 614, a push type 616, and/or a web banner type 618. In the case where the message is determined as of an email type (e.g., a first message type), the message is split into a first set of subcomponents at 620. In one embodiment, the first set of subcomponents is configured to include a subject line, a preheader, a banner image, introduction text, and Call to Action item. In the case where the message is determined as of a SMS type, a push type, or a web banner type (e.g., a second message type), the message is split into a second set of subcomponents at 625. For example, the second set of subcomponents can be configured to include an introduction, a value proposition and/or body, and an ending item. Regardless how the messages are divided into various subcomponents based on the determined message type, each subcomponent identified in the first set of subcomponent and/or the second set of components is mapped to a pre-configured scoring framework at 632 to determine a plurality of respective scores. In some embodiment, the plurality of scores is a plurality of semantic scores. In one example, the numeric score is a percentage in decimal form. Subsequently, the mapping results from step 632 is further mapped against the information with respect to audience persona as well as content preferences at 634. Based on the mapping results from step 634, personalized content is generated at 636, which is provided in a feedback loop to further train the ability of audience prediction and content preferences of the content personalization engine. The personalized content is generated at 636 is also output to the communication application (e.g., the communication application 109 of FIG. 1, the message creator 1500 of FIG. 15)

The mapping of each subcomponents of the first set of subcomponents and the second set of subcomponents based on the pre-configured scoring framework generates the plurality of semantic scores that correspond to a plurality of semantic categories. In some embodiment, each of the semantic score is based on an evaluation of each respective subcomponent in a respective semantic category of the plurality of semantic categories. According to various embodiments, each of the plurality of semantic categories includes at least three semantic categories selected from a plurality of pre-configured categories. For example, the plurality of semantic categories can include a sentiment category, an emotion category, a perceived message type category, a semantic relatedness category, a feeling category, a tone category, a perception category, a micro structure category, and an emotional intelligence category.

In some embodiments, the sentiment category may include 2 or more subcategories selected from positive, neutral and negative. The perceived message type category may include various (e.g., 2 or more, 3 or more, etc.) subcategories selected from news, feedback, query, marketing, and spam. The emotion category includes 23 or more subcategories selected from boredom, anger, excitement, sadness, fear, joy, trust, pride, anticipation, anxiety, safety, urgency, luck, guilt, exclusivity, fascination, achievement, gratification, encouragement, intimacy, curiosity, gratitude, and challenge.

The mapping of a subcomponent to the pre-configured score framework can be performed by comparing an input (e.g., a variant message) with a control subcomponent (e.g., a portion of a sentence) having a pre-assigned scores associated with the above-described semantic categories. In some embodiments, by analyzing the similarity and difference with the control subcomponent, the plurality of semantic scores can be generated for the subcomponent.

Figure 7A:
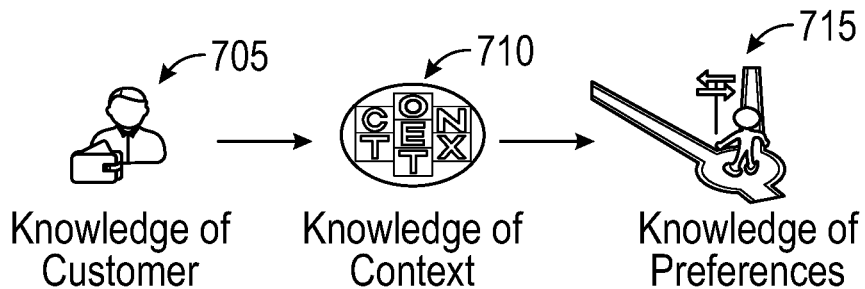

FIG. 7A is a diagram illustrating various features associated with exemplary aspects/operations of generating predictive content, consistent with certain embodiments of the present disclosure. As shown in FIG. 7A, a content engine (not shown) may utilize knowledge of customer 705, knowledge of customer context 710, and/or knowledge of customer preferences 715 to form an intelligence knowledge base of a customer, or a group of customers. Based on such intelligence knowledge base, content communicated to a customer can be predicted and personalized along these dimensions to generate customer-tailored intelligent messages 716.

Figure 7B:
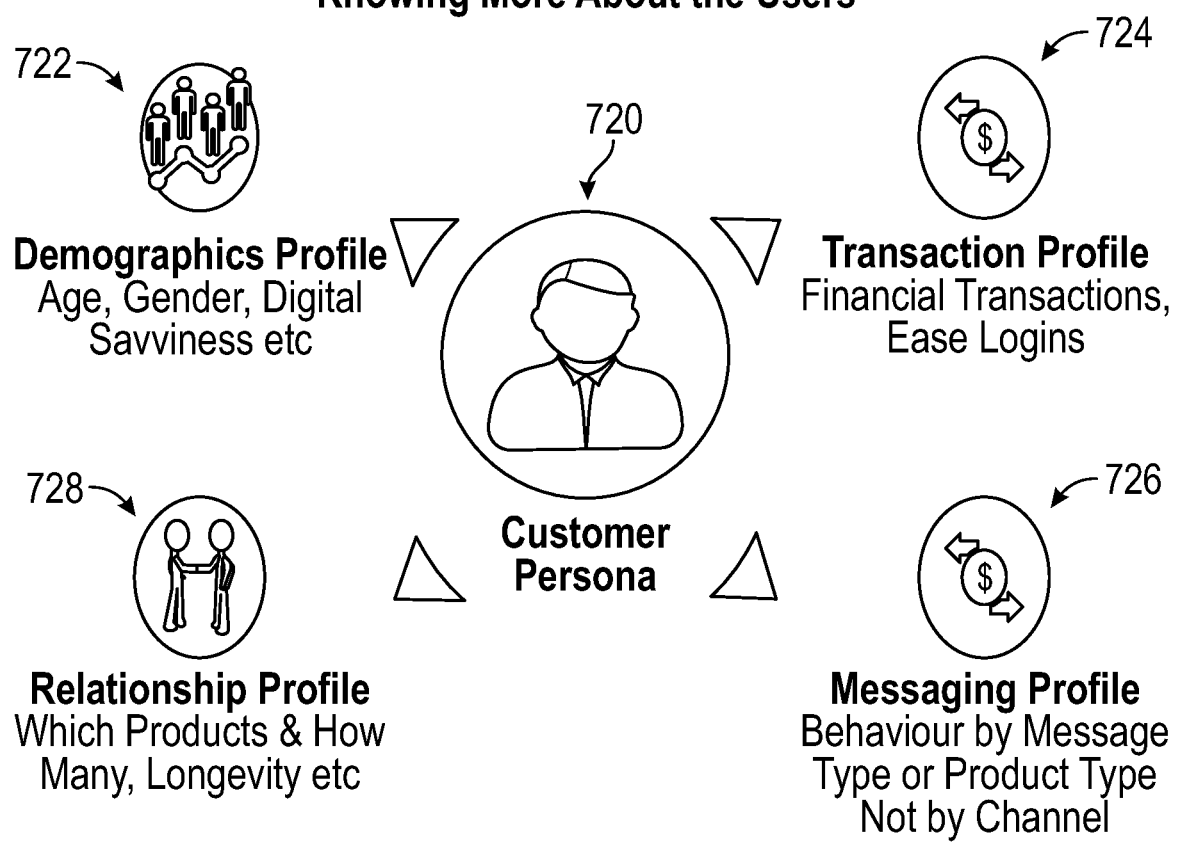

FIG. 7B is a diagram illustrating various features associated with exemplary aspects/operations of generating predictive content, consistent with certain embodiments of the present disclosure. A customer persona 720 may be generated consistent with the customer knowledge base 705 of FIG. 7A. As shown herein the exemplary diagram, customer persona 720 may include, for example, customer's demographic profile information 722, customer's transaction profile information 724, customer's messaging profile information 726, and customer's relationship profile information 728. In some embodiments, the demographical profile information 722 may include data such as age, gender, digital savviness, and the like. The transaction profile information 724 may include data such as the types, numbers, and/or frequency of transactions (e.g., financial transactions), the ease login configurations, and the like. The messaging profile information may include data such as a customer's behaviors associated with different messaging channels (e.g., frequent email reader on mobile device), product/service types associated with different communication channels (e.g., responsiveness to SMS offering products/services), and the like. The relationship profile information 728 may include data on which services/products a customer has purchased, been active with, the number of services/products the customer has been engaged with, the duration of time associated with services/products the customer has purchased and/or engaged with, and the like. All the attributes associated with profile information 722, 724, 726 and 728 are included as persona attributes of the customer persona 270.

Figure 7C:
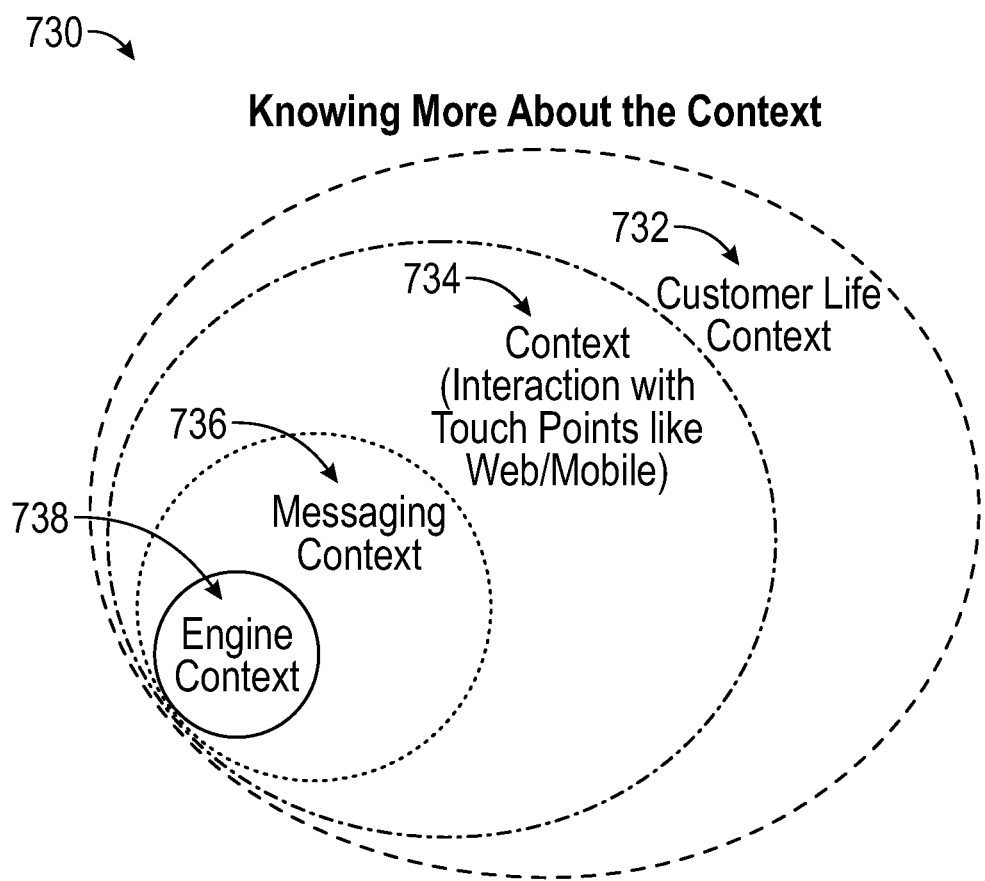

FIG. 7C is a diagram illustrating various features associated with exemplary aspects of a customer context knowledge base(s), consistent with certain embodiments of the present disclosure. Referring to FIG. 7C, customer context knowledge base 730 can implement the customer context knowledge base 710 of FIG. 7A. As shown herein the exemplary diagram, customer context knowledge base 730 may include any types of contextual information about a customer or a group of customers. For example, customer context knowledge base 730 can include a customer life context base 732, a content/service/product provider context base 734, a messaging context base 736, and an engine context base 738. In some embodiments, the customer context base 734 may include information collected about a customer at various portals such as interactions at a web portal, at a customer's mobile device, etc. The messaging context base 736 may include, for example, content personalization sensitive or content personalization insensitive information. The engine context base 738 may include the contextual information gathered, processed, and/or derived for use of personalizing content for communication to the customers. As shown herein, one of the context bases may include a set of information that can be a sub-set of information of another context base.

FIG. 7D is a diagram illustrating various exemplary usage aspects of a customer persona knowledge base and a customer context knowledge base, consistent with certain embodiments of the present disclosure. As shown herein, an agent or a content personalization engine (not shown) of a service/product provider may identify a use case 742 that involves communication with a customer. The use case 742 may designate the creation of a message including a specific item of content that is intended for the customer. The agent may turn to the knowledge bases to seek answers to the question such as whether there are information on the customer that may affect how the customer is likely to react to and/or respond to the message.

In this exemplary scenario, the exemplary content personalization agent/engine in accordance with at least some embodiments of the present disclosure explores the possible solutions with assistance of persona attributes 744 and context attributes 746. The personal attributes 744 can be provided by the persona knowledge base 720 of FIG. 7B, and the context attributes 746 can be provided by the context knowledge base 730 of FIG. 7C. For example, the persona attributes 744 included in the persona knowledge base may help answer the question of what customer persona attributes are relevant to the instant use case and the message to be communicated. The context attributes 746 may help answer the question of what and whether there are customer contextual circumstances and/or conditions that may impact the relevance of the message to be communicated. Equipped with the information of the persona attributes and the context attributes, the exemplary content personalization agent/engine is able to predict the customer preferences for the purpose of generating a particular message in a particular use case. In some embodiments, such message generated based on the predicted customer preferences is included as training data (e.g., sample data 405 of FIG. 4) to provide a feedback/validation loop for the prediction.

Figure 7E:
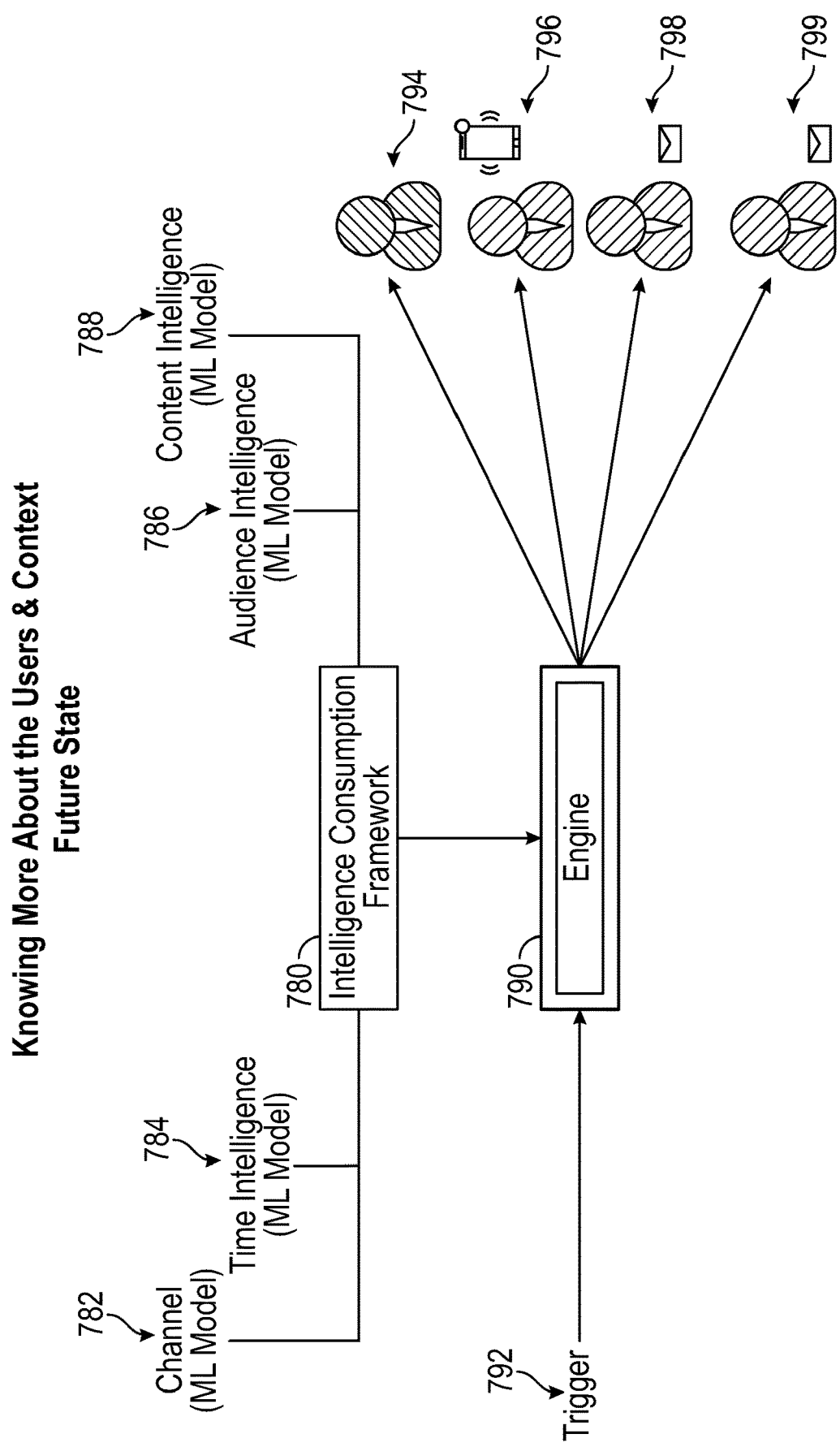

FIG. 7E is a diagram depicting an exemplary use scenario in connection with a messaging engine, consistent with certain embodiments of the present disclosure. As shown in FIG. 7E, a messaging engine 790 may be configured in communication with an intelligence consumption framework 780 to access and utilize various intelligence generated based on various customer knowledge bases. For example, one or more of channel intelligence 782, time intelligence 784, audience intelligence 786, and content intelligence 788 may be included and feed information to the intelligence consumption framework 780.

Referring to FIG. 7E, a messaging engine 720, empowered with various intelligence regarding the creation and transmission of a message, and upon receiving a trigger signal 792, may be configured to transmit personalized messages 796, 798, and 799 to customers at respective personalized communication channels, or not to transmit a message (lack of a message) 794 to a customer. For example, the message 796 may be transmitted to a customer as a SMS message to the mobile device of the customer. Both message 798 and message 799 may be transmitted to a respective customer as an email message to an respective email address associated with the customers. However, as indicated by the varying patterns of the hatching lines, the email message 798 may be generated and personalized differently than the email message 799, depending on the semantic scores of the respective customers.

Messages 796, 798, 799 can be personalized via various ways to tailor to the customer's persona information as well as the customer's contextual information. For example, the text message 796 may be specifically shortened in order to improve the degree of candor of the message, action-oriented words can be packed into the limited number of words to increase the likelihood of engagement with the customer. For another example, email messages 798 and 799 may be personalized by addressing the customers with their respective first names in the subject line, introducing a tone expressing concern and urgency in reminding the customer the importance of reading its content (e.g., help the customer to stay current on various security frauds and prevention measures, etc.) More detail regarding content personalization is described below with references to FIGS. 8-13.

Figure 7F:
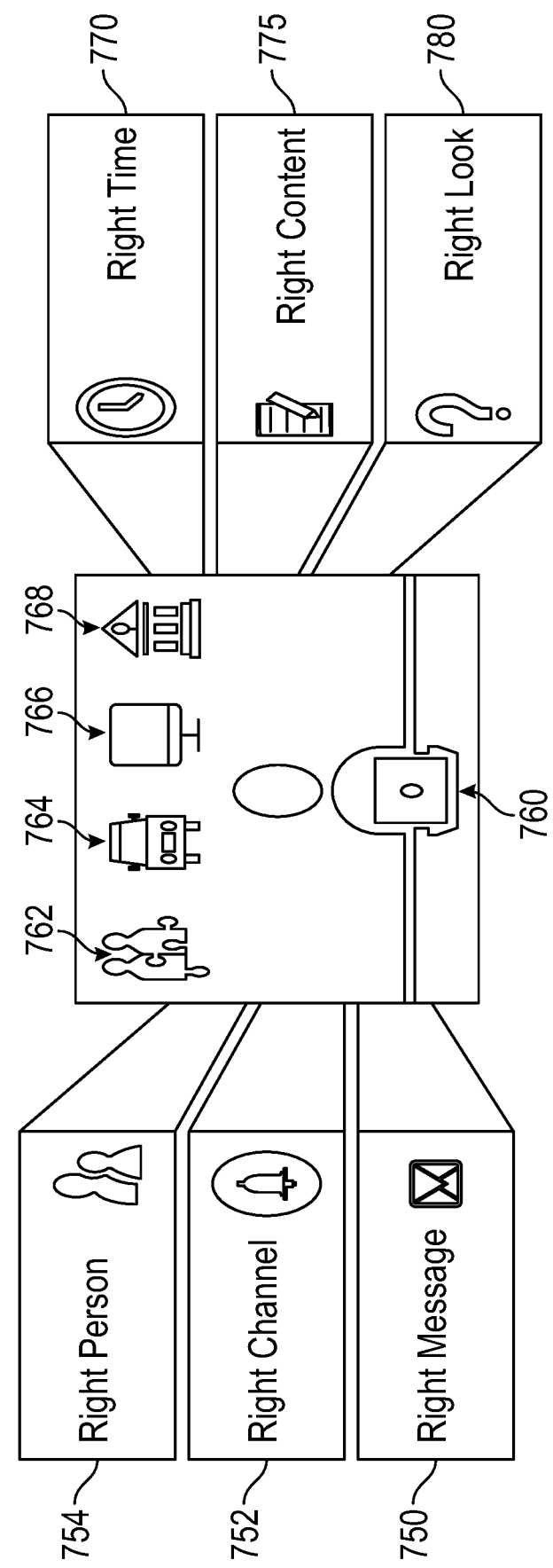

FIG. 7F is a diagram depicting an exemplary use scenario in connection with a content engine, consistent with certain embodiments of the present disclosure. As shown in FIG. 7F, information (intelligence, insight) as to who is the right person 754, information as to which communication channel is best 752, and information as to what is the right message 750 may be supplied to assist a content engine 760 to generate intelligent messages that leverage the information/ intelligence 754, 752 and 750 to achieve: 1) being transmitted at a right time 770 (e.g., preferred time), 2) including the right content 775 (e.g., personalized content), and/or 3) being presented in the right look-and-feel 780 (e.g., personalized according to various semantic scores), i.e., for the intended recipient or target audience. As also illustrated herein, the content personalization engine 760 further takes into account of various contextual information such as interaction attributes 762, automotive purchase details 764, interactions with web and mobile applications 766, and transaction information 768.

Figure 8:
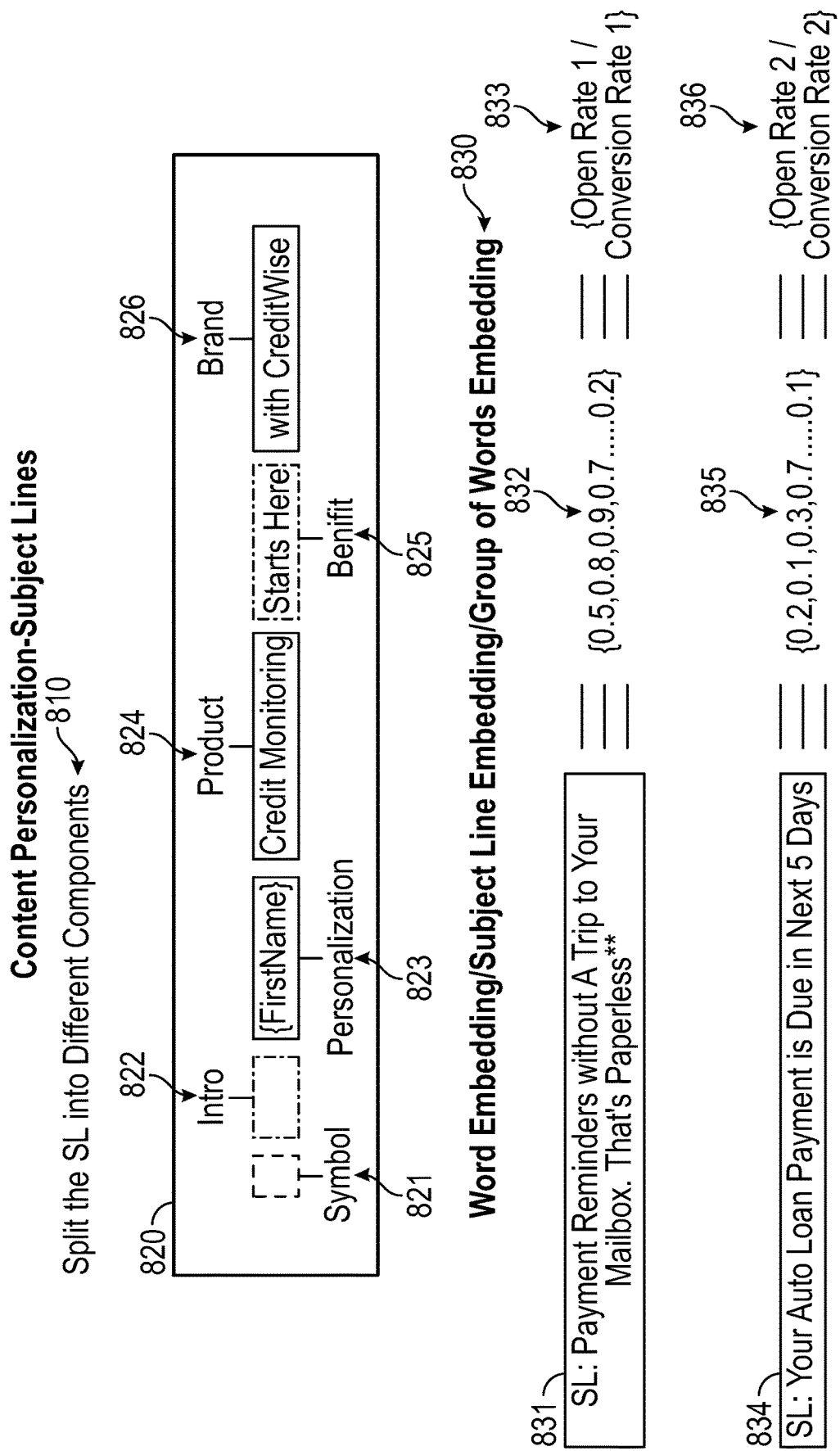
FIG. 8 is a diagram illustrating exemplary content personalization aspects related to subject lines, consistent with certain embodiments of the present disclosure.

FIG. 8 is a diagram illustrating exemplary content personalization aspects related to subject lines, consistent with certain embodiments of the present disclosure. As shown in the illustrated embodiment, a subject line 820 may be personalized via splitting the subject line 820 into a set of subcomponents, which may be done via machine learning models and techniques. In this example, the set of subcomponents includes a symbol 821, an introduction 822, a personalized first name 823, a product description 824, a benefit description 825, as well as brand description 826. In some embodiments, the splitting of the subject line 820 into the plurality of subcomponent can be validated and improved with more precision. Next, machine learning techniques/models may be utilized to optimize on the identified subcomponents for personalization. For example, emotion related prediction can be applied to the subcomponent of benefit description, as it has the possibility being modified to best emotionally appeal to a target customer. Optimization may also be performed with regard to the positioning of each of the subcomponents within the subject line 820, as well as the functionality or persuasiveness associated with the different wording of one or more subcomponents 821-826.

The bottom half of FIG. 8 illustrates another example of predictively generating subject lines, consistent with certain embodiments of the present disclosure. In this exemplary approach, a technique of word embedding, subject line embedding, and/or groups of word embedding is utilized to personalize a subject line. As used herein, "embedding" refers to a technique that converts text/word or other non-numeric information into numbers. With such textual or non-numeric information represented in respective numbers, NLP techniques can be used to transform words into one or more vectors of numbers for feeding into a machine learning model. For example and as shown herein, a textual subject line 831 can be transcribed into a vector of numbers 832, which is in turn provided to a machine learning model for processing. As shown herein, the machine model outputs an evaluation 833 of the predicted effectiveness for the subject line 831. In comparison, a subject line 834 can be transcribed into a vector of number 835, which prompts the machine learning model to provide an evaluation 836 of the predicted effectiveness for the subject line 834. In some embodiment, such effectiveness is captured in terms of a rate of how likely the target customer will open the content, as well as a rate of how likely the target customer will be converted by the content.

Figure 9A:
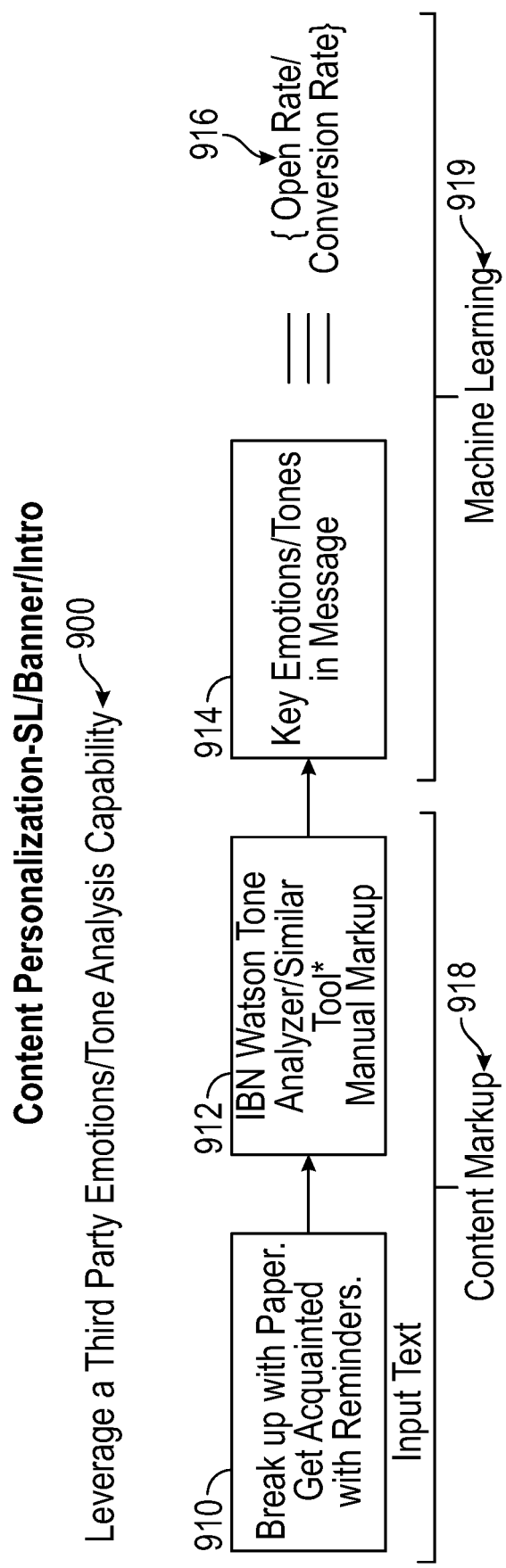
FIGS. 9A-9B are diagrams illustrating exemplary aspects of predictive content generation associated with subject lines, banners and/or introductory portions of communications, consistent with certain embodiments of the present disclosure.

FIG. 9A is a diagram of an exemplary predictive generation of subject lines together with banner images and introduction materials, in accordance with certain embodiments of the present disclosure. As shown herein, at content markup stage 918, historical content (e.g., historical messages) can be provided to a mark-up tool 912 for manual annotating. Such markup tools can include, for example, Watson tone analyzer, and/or other suitable libraries or tools. In some other embodiments, automated markup can also be performed with the suitable techniques and validation will be accordingly provided to ensure the quality of the markup. With the annotated banner images and/or introduction materials (e.g., introduction paragraphs of the messages), a machine learning model can be generated to predict which banner images and/or which introduction material convey what degrees of semantically impactful information to the target customer. For example, at a machine learning stage 919, a machine learning tool or model may determine one or more key emotions and tones associated with the image banners and introduction materials. As a result, the machine learning model is configured to generate a prediction 916 of an effectiveness degree for the banner image and introduction material. In some embodiments, the effectiveness is similarly captured in the above-noted rates (e.g., open rate and conversion rate).

Figure 9B:
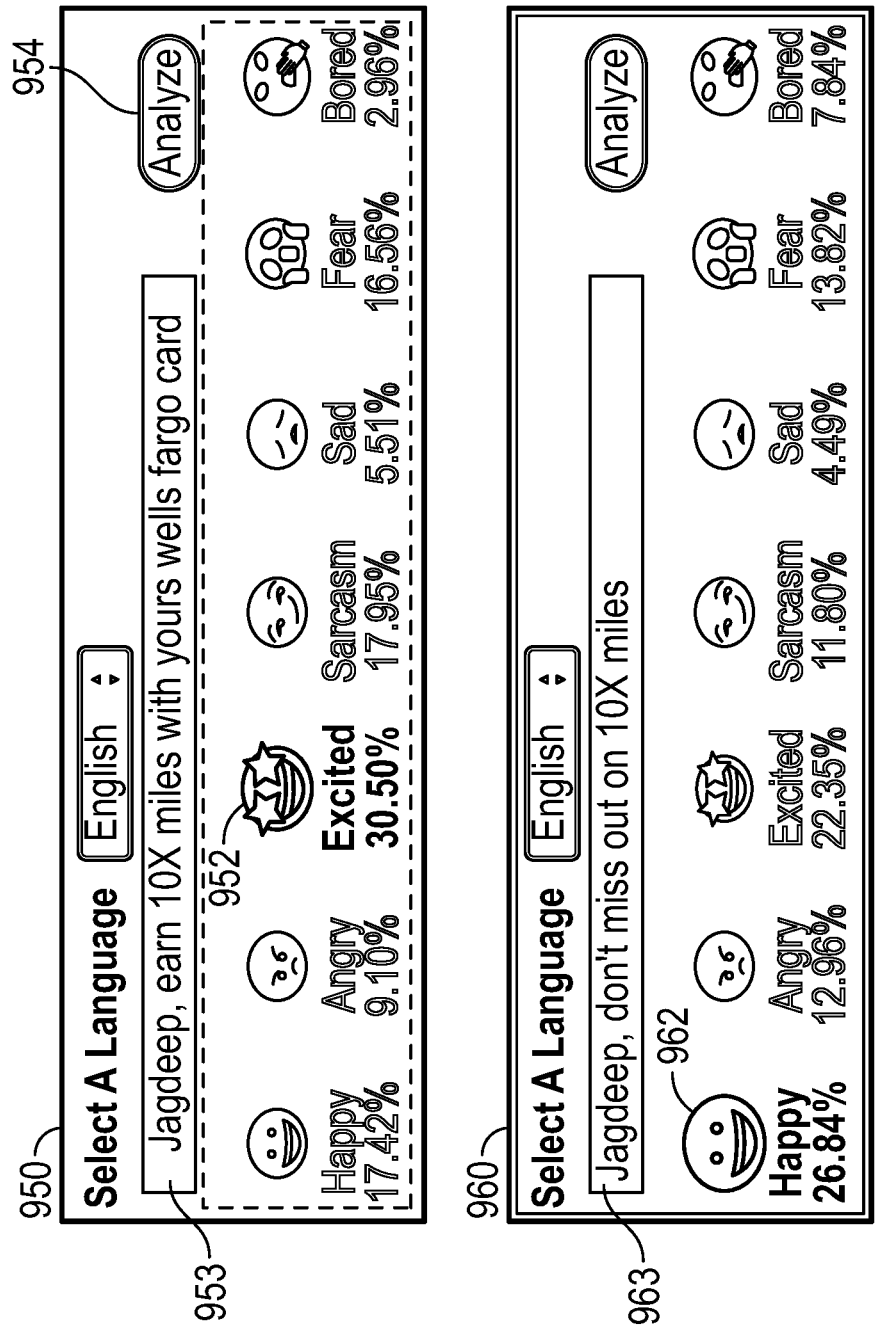

FIG. 9B is a diagram of additional exemplary predictive generation of subject lines together with banner images and introduction materials, consistent with certain embodiments of the present disclosure. In the example embodiments of FIG. 9B, a first UI 950 is provided to allow for selection of different subject lines for evaluation. In first UI 950, a subject line 953 is selected by a message creator. Upon clicking on an "analyze" button 954, the panel 950 is configured to display a determined emotion score/indicator 952 for the selection 953. As shown herein, the subject line 953 is evaluated against all the emotion categories and scored correspondingly under each of such categories. In some embodiments, first UI 950 may also be configured to display two additional semantic scores from two other semantic categories. For example, first UI 950 may display various key emotions associated with the selection 953, such as excitement (30.50%), sarcasm (17.95%), happiness (17.42%), anger (9.10%), sadness (5.51%), fear (16.56%), boredom (2.96%), and the like; other data may also be displayed such as open rate, click rate, or the like. In comparison, for the same target customer or segment, another subject line 963 may be selected, in a second UI 960, for evaluation. As with the first UI 950, second UI 960 may be configured to display a determined emotion score/indicator 962 for the selection 963. As shown herein, the subject line 963 is evaluated against all the emotion categories and scored correspondingly under each of such categories. In some embodiments, second UI 960 may also be configured to display two additional semantic scores from various other semantic categories. For example, second UI 960 may display key emotions such as happiness, anger, excitement, sarcasm, sadness, fear, boredom, and the like, along with an evaluation of data such open rate, click rate, and/or other relevant indicators.

Figure 10:
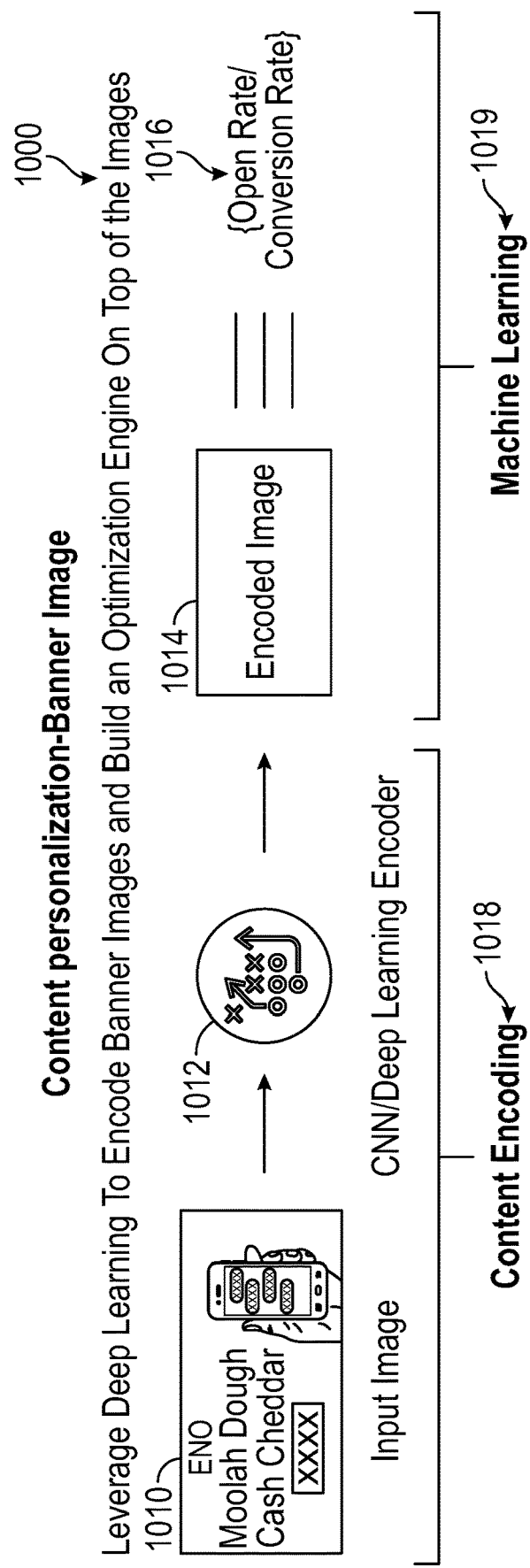
FIG. 10 is a diagram illustrating exemplary aspects of predictive content generation associated with a banner image, consistent with certain embodiments of the present disclosure.

FIG. 10 is a diagram illustrating exemplary aspects of predictive content generation associated with a banner image, consistent with certain embodiments of the present disclosure. In the example of FIG. 10, a predictive banner image may be generated via use of image encoding and machine learning techniques. In a content encoding stage 1018, historical banner images 1010 of historical communication content can be provided to an encoder tool 1012 for encoding. In a machine learning stage 1019, the encoded banner images can be provided to create and train a machine learning model, which can be used to predict which banner images convey what degrees of semantically impactful information to the target customer. For example, at the machine learning stage 1019, the machine learning model can determine which banner images best suit the message to be transmitted. As a result, the machine learning model is configured to generate a prediction 1016 of an effectiveness degree for the banner image. In some embodiments, the effectiveness is similarly captured in the afore-described rates (e.g., open rate and conversion rate).

Figure 11:
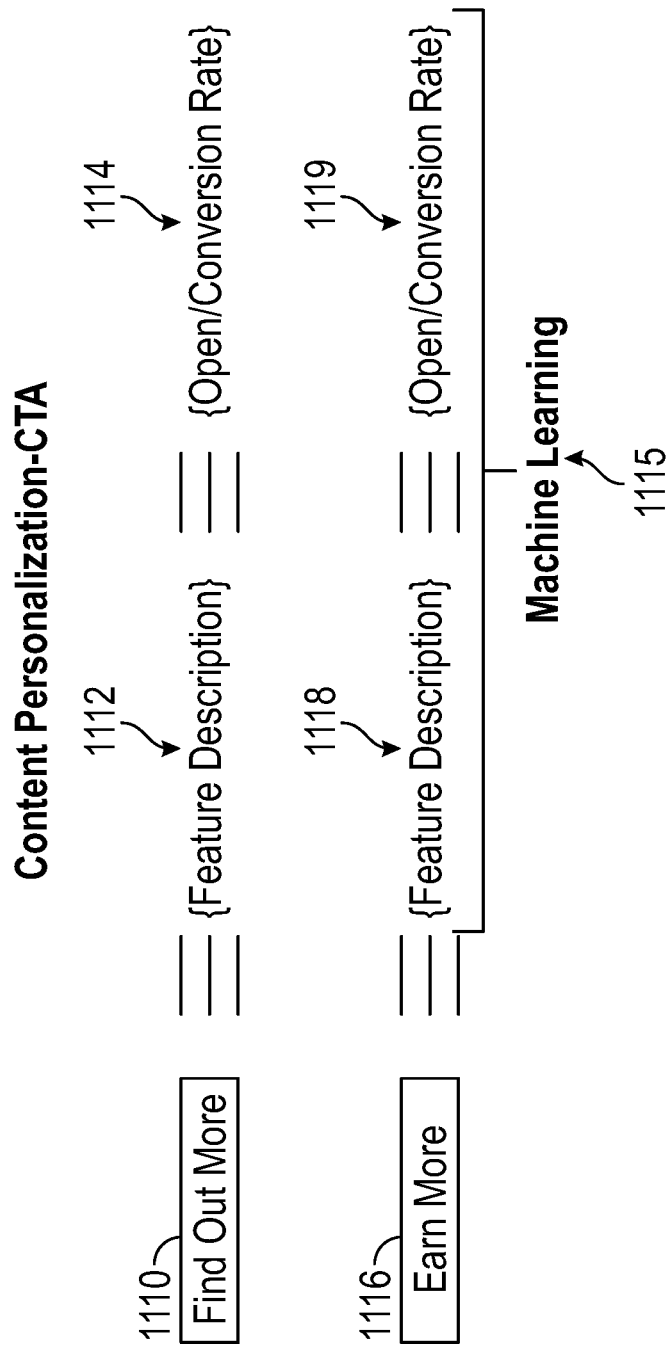
FIG. 11 is a diagram illustrating exemplary aspects of predictive content generation for a Call To Action (CTA) associated with a communication, consistent with certain embodiments of the present disclosure.

FIG. 11 is a diagram illustrating exemplary aspects of predictive content generation for a Call To Action (CTA) associated with a communication, consistent with certain embodiments of the present disclosure. In the example embodiment shown in FIG. 11, a CTA item can be personalized by use of feature description and machine learning techniques. In a content input stage 1115, historical CTA items 1010 and 1116 of historical communication content can be annotated with a description 1112 and 1118, respectively, of a set of one or more features that affects the CTA item's effectiveness. In some embodiments, the set of features may include, for example, the position of CTA item in relation to the message and other content items of the message, functionality and persuasiveness associated with the wording/language used in the CTA item, the length of the CTA item, the formatting such as the background color, the text color, the font, the size, the inclusion of emojis, animation, and the like.

With regard to the machine learning portion/aspects 1115, the labeled CTA items may be provided to create and/or train a machine learning model, which can be used to predict which CTA items convey what degrees of semantically impactful information to the target customer. For example, at the machine learning portion 1115, the machine learning model can determine which CTA item best suit the message to be transmitted. As a result, the machine learning model is configured to generate predictions 1114 and 1119 of effectiveness degree(s) for CTA items 1110, and 1116, respectively. In some embodiments, the effectiveness may be similarly captured in connection with success rates, e.g., open rate, conversion rate, etc.

Figure 12A:
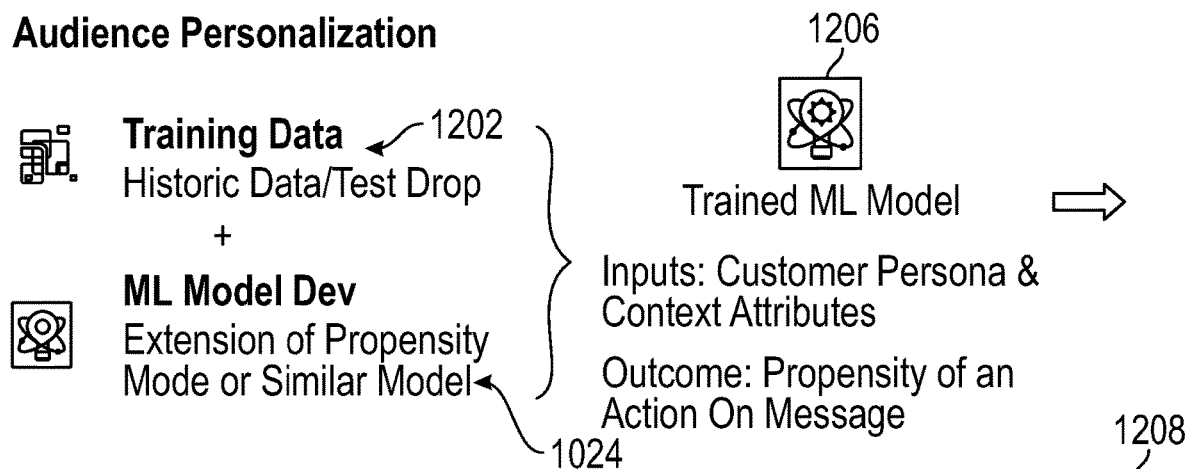
FIGS. 12A-12B are diagrams illustrating exemplary audience personalization aspects associated with predictive content generation, consistent with certain embodiments of the present disclosure.

FIG. 12A is a diagram illustrating exemplary audience personalization aspects associated with predictive content generation, consistent with certain embodiments of the present disclosure. In the example shown in FIG. 12A, training data 1202 and machine learning models 1024 are provided to generate trained model 1206. In some embodiments, for example, the input data may include historical data and/or testing data related to customer persona attributes and/or customer context attributes. As an outcome, the trained model 1206 may generate or utilize a propensity model that is configured to predict a likelihood of an action on a message targeting a customer. In some embodiments, such model 1206 may be used to generate a set one or more outputs 1208. Here, for example, the model 1206 can be a model that is retainable with data from different communication channels as well as data related to different historical messages. In other embodiments, the model 1206 predicts an estimated incremental lift audience optimization that can be taken into account for personalization. In some other embodiments, the model 1206 further predicts which ones of persona and context attributes have an impact in terms of the effectiveness of the message.

Figure 12B:
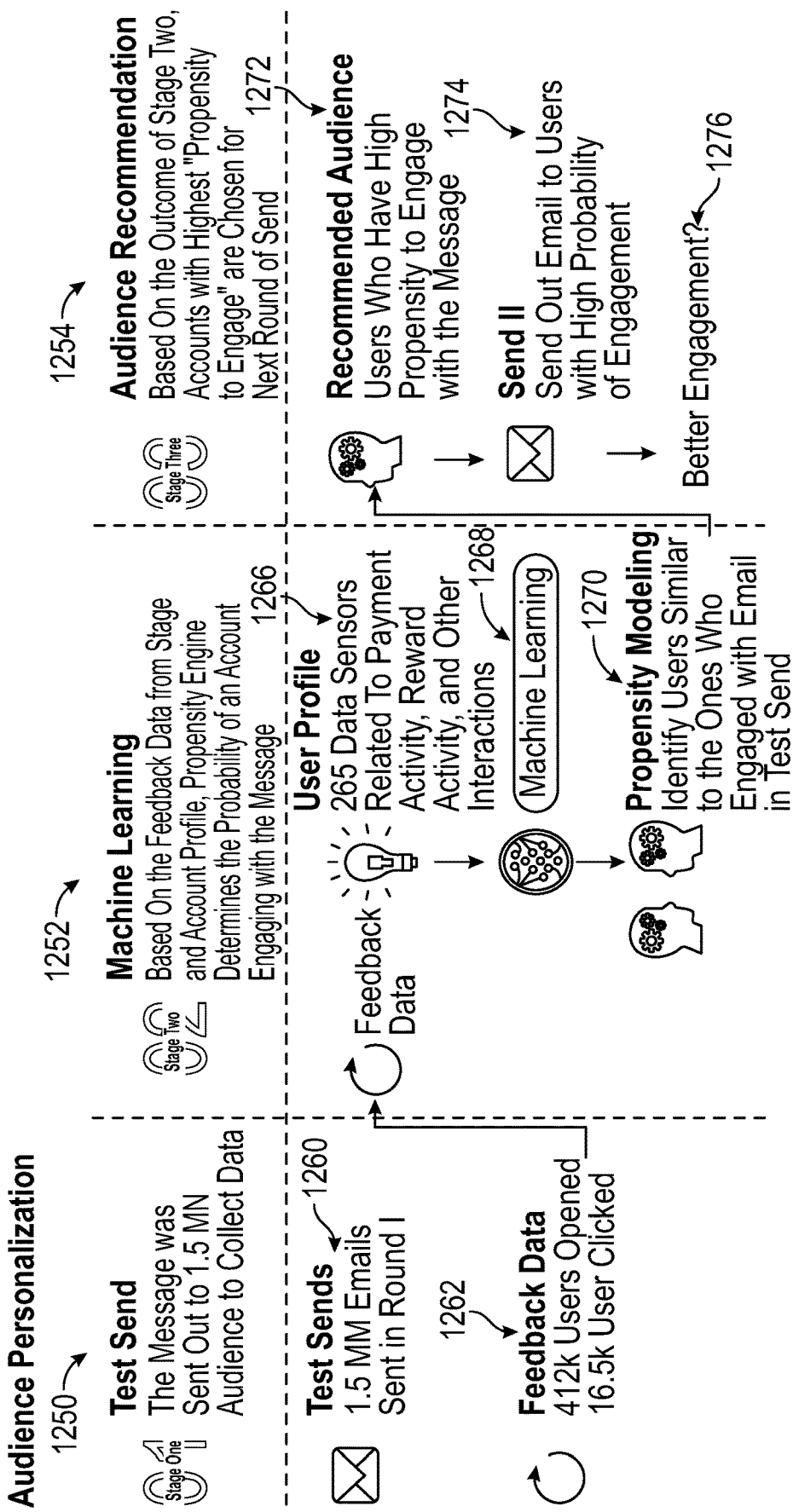

FIG. 12B is a diagram illustrating additional exemplary audience personalization aspects associated with predictive content generation, consistent with certain embodiments of the present disclosure. In the embodiment of FIG. 12B, the exemplary audience personalization process begins at 1250, a test stage (stage one) in which messages are sent to multiple customers, at 1260, to collect feedback data, at 1262. Here, with respect to such embodiment(s), such data can indicate how many customers have opened the message, how many customers have clicked through to conversion, and the like. Next, at a machine learning stage 1252 (stage two), based on the feedback data from stage one, as well as profile information 1266 associated with the customers, a propensity prediction engine may be generated or utilized, at 1268, and used, e.g., to predict the likelihood of a customer being engaged with a message at 1270. In particular, the propensity model can be used to identify other customers who are similar to the ones who have engaged with the message sent in stage one. Next, in an audience recommendation stage 1254, based on the outcome of stage two 1252, the customers having the highest likelihood to engage with the message (e.g., the customers identified at 1270) are recommended as the target audience in relation to the message at 1272. Such recommendation can be provided to, for example, whatever platform, tool, or application employs such predictive content generation techniques, such as message creator UI 1500 of FIG. 15. Moreover, with such enhanced knowledge of the audience, the messages may be generated and transmitted to only a target audience of more/most relevance. Further, in some embodiments, as shown at 1276, such as when further feedback data is available, the propensity model can be validated or tuned for better prediction of effective customer engagement. Here, for example, according to some implementations, the messages can be clustered based on the based on the audience recommendation.

Figure 13:
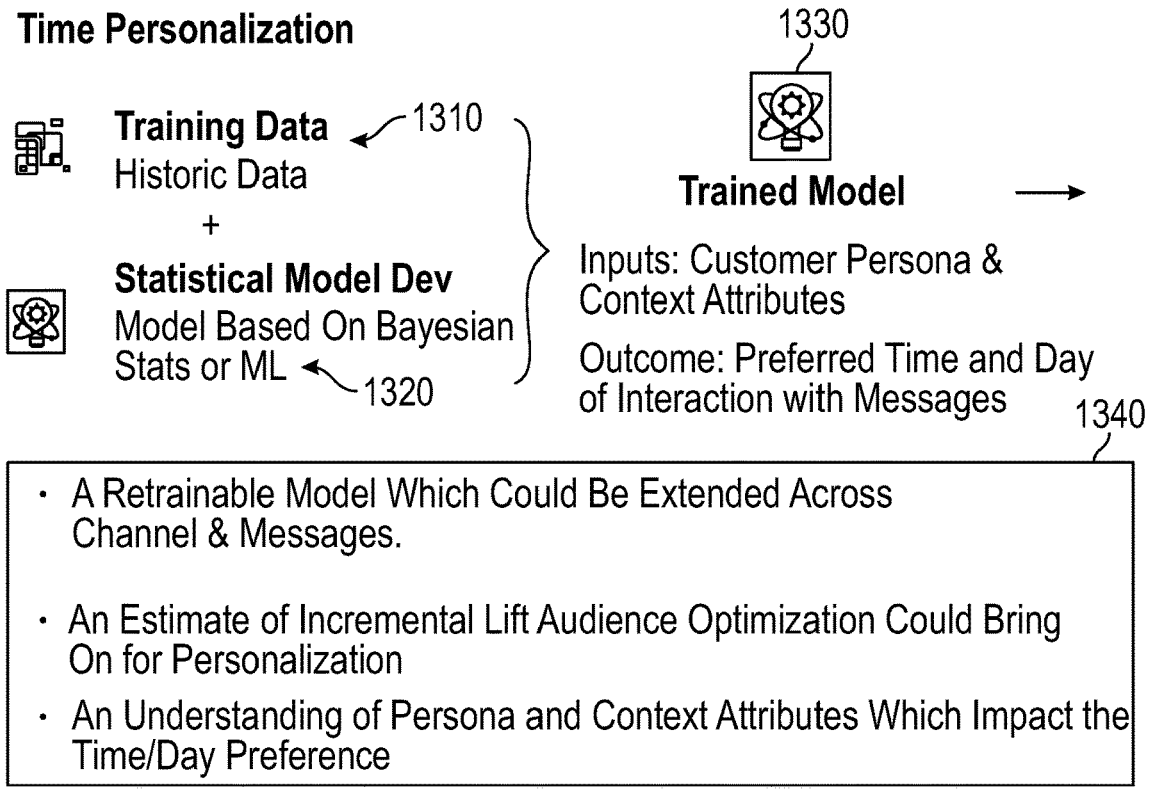
FIG. 13 is a diagram illustrating exemplary time personalization aspects associated with predictive content generation, consistent with certain embodiments of the present disclosure.

FIG. 13 is a diagram illustrating exemplary time personalization aspects associated with predictive content generation, consistent with certain embodiments of the present disclosure. In the example embodiment of FIG. 13, training data 1310 and machine learning models 1320 may be provided to generate trained model 1330. Here, for example, the input data can include historical data related to customer persona attributes and/or customer context attributes. As an outcome, the trained model 1330 may produce output(s) configured to predict various advantageous communication parameters, such as a preferred time/day for likely interaction with a message targeting a customer. In some embodiments, such model 130 may have various advantages and/or generate various advantageous outputs, as shown at 1340. For example, the model 1330 can be a model that is retainable with data from different communication channels as well as data related to different historical messages. In some embodiments, the model 1330 may predict an estimated incremental lift audience optimization, e.g., which could be taken into account for personalization. In other embodiments, the model 1330 may further reveal or determine an understanding of persona and context attributes which predict the time/day preferences of a customer, e.g., impacting the effectiveness of the communications or messages.

Figure 14:
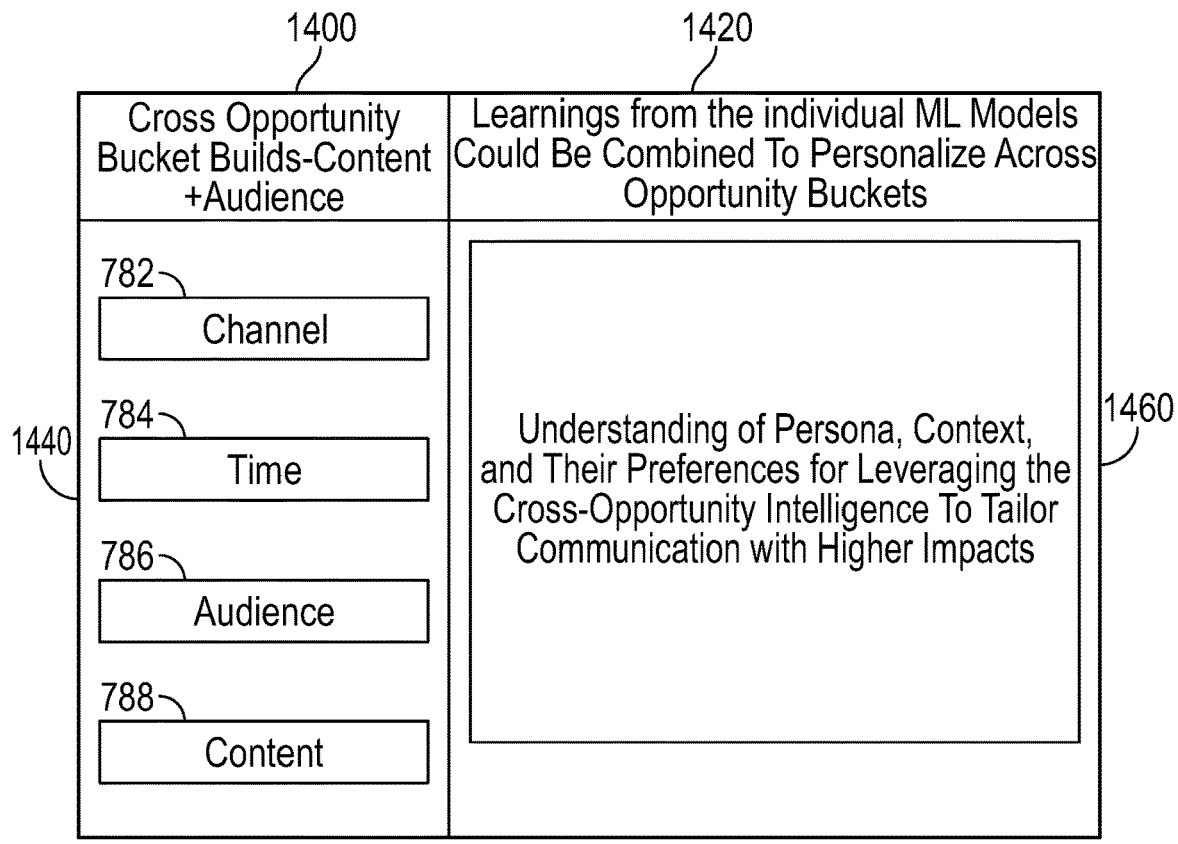
FIG. 14 is a diagram illustrating exemplary cross-opportunity content personalization aspects associated with predictive content generation, consistent with certain embodiments of the present disclosure.

FIG. 14 is a diagram illustrating exemplary cross-opportunity content personalization aspects associated with predictive content generation, consistent with certain embodiments of the present disclosure. In the embodiment of FIG. 14, machine learning models that correspond to information being generated such as channel intelligence 782, time intelligence 784, audience intelligence 786, and content intelligence 788 may be utilized in generating an overall cross-opportunity model 1440. In such implementations, the totality of an understanding of persona, context, and preferences may be leveraged to generate cross-opportunity intelligence and further tailor communication with customers with higher impacts and effectiveness.

Figure 15:
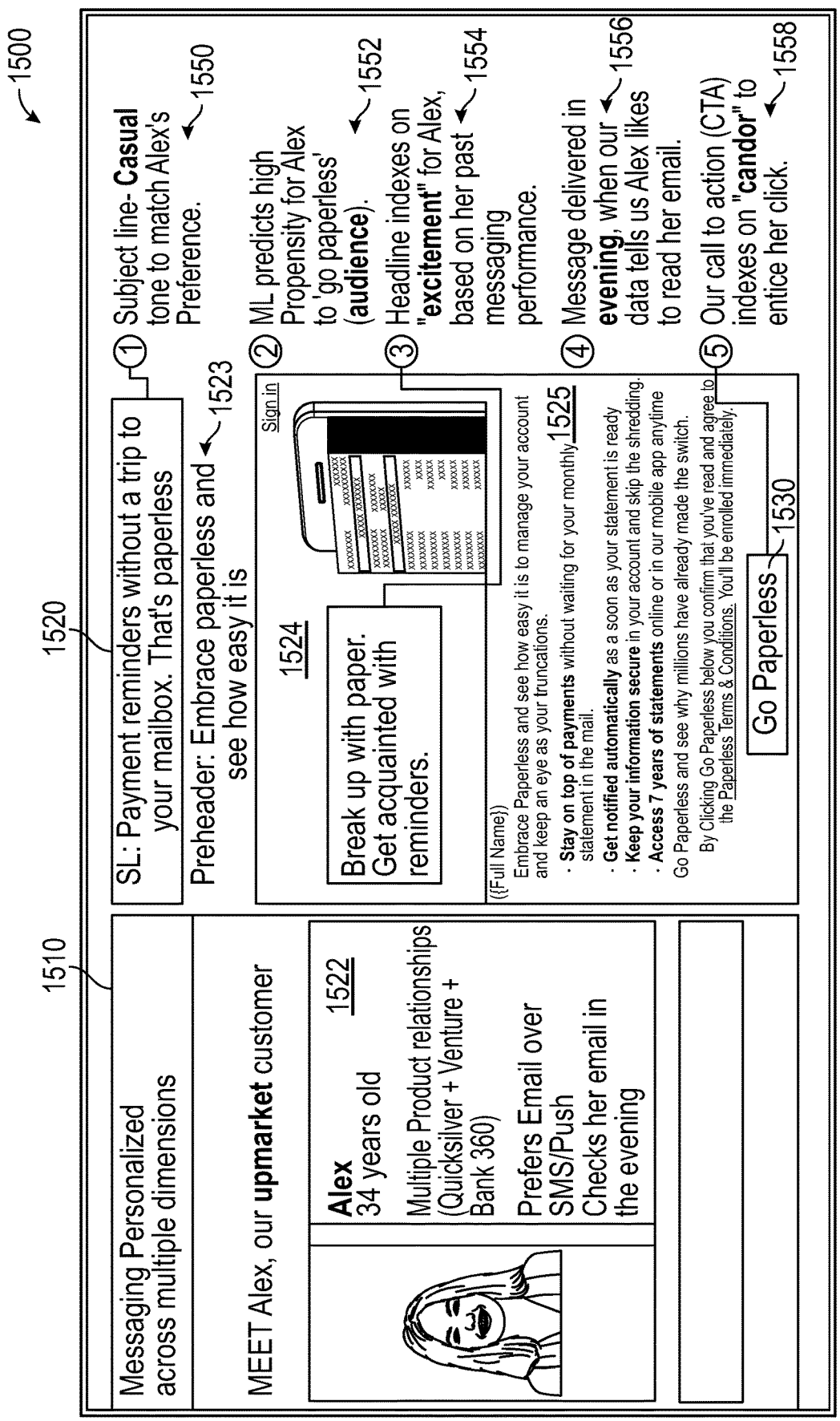
FIG. 15 is an exemplary user interface associated with aspects of the predictive content generation herein, consistent with certain embodiments of the present disclosure.

FIG. 15 is an exemplary user interface associated with aspects of the predictive content generation herein, consistent with certain embodiments of the present disclosure. Referring to the example embodiment of FIG. 15, UI 1500 may be implemented as a message creator with which a service provider agent, such as a line-of-business (LOB) agent, interacts to create more predictive, intelligent messages for transmission to a selected user or a group of selected user. In one example, UI 1500 can be implemented at the communication application 109 of FIG. 1.

As shown in FIG. 15, UI 1500 may include one or more of the three example panels illustrated: a left-hand panel 1510, a middle panel 1520, and a right-hand panel 1550. As shown in this example UI, the LOB agent has selected customer "Alex" as the target audience and thereby navigate to UI 1500. As such, at left-hand panel 1510, a textual line of "Meet Alex, our upmarket customer" is displayed, along with other information about customer Alex. For example, as illustrated herein, a photo of Alex is displayed, a brief prolife of Alex is also displayed to provide the LOB agent with a quick glance about the system knowledge on Alex. In the illustrated example, Alex is 34 years old, she has already purchased multiple products and therefore in a multi-product relationship with the provider. It is also shown that Alex prefers be contacted via emails than other communication channel such as SMS, or other push messaging. It is also displayed that Alex usually reads her emails in the evening.

According to the illustrated embodiment, in the middle panel 1520, a subject line area 1521, a headline area 1524, a message body area 1525, and a Call To Action (CTA) item 1530 may be organized and displayed to emulate the look-and-feel of a message to be presented to a customer. The subject line area 1521 may be configured to display a subject line recommended by the content personalization engine. Underneath, a headline area 1521 may be provided and configured to display a headline recommended by the content personalization engine. An image banner 1523 may also included as part of the headline. Further, a message body area 1525 may be configured to display the message body text recommended by the content personalization engine. At the bottom of the middle panel 1520, the CTA item 1530 may be configured as an item having an emotional index recommended by the content personalization engine.

In the example embodiment of FIG. 15, in the right-hand panel 1540, a plurality of annotation for the content personalization recommended in the middle panel 1520 may be displayed. Here, for example, a subject line personalization annotation 1550 may be displayed to indicate that, based on the engine's knowledge of Alex, a casual tone is used to match with Alex's preference. An audience prediction annotation 1552 may also be displayed, e.g., to indicate that Alex is highly likely to respond to the "go paperless" service offered in the message. Here, for example, according to different embodiments, Alex might be pre-selected from within a set of customers who are identified as those of high propensity for going paperless, or Alex might be a targeted customer, with the engine confirming that Alex is the right type of audience for this type of message. An emotion predictor annotation 1554 may also be displayed to indicate that "excitement" is themed in the headline, based on the past messaging experience and/or performance. Further, a time intelligence predictor annotation 1556 may be displayed to indicate that the message should be transmitted in the evening, since according to analysis by the engine, this is determined to be the most likely time that Alex would read and respond to her emails. Finally, a Call-to-Action (CTA) annotation, field, button or prompt 1558 may be displayed, indicating an appropriate tone suitable for the target individual, such as the tone of "candor," e.g., in order to more successfully engage Alex and encourage her to click or take the action to accept the offer.

According to embodiments herein, texts in the areas of subject line, preheader, body of text, and CTA choices can be further modified by the agent in addition to the intelligent messages generated by the content personalization engine. For example, an agent may be provided with personal information of Alex from previous communications, which may inform the agent's decision on best communication criteria to use. Similarly, the agent may change the image banner to an image of interest, to an animated icon, or the like, to further engage Alex's attention to the service offered in the message.

In further embodiments, other UI elements and options may be included, such as a button to confirm the adoption of the intelligent message auto-generated by the content personalization engine, a button to preview the finalized message, and/or UI options to configure the transmission of the message to a customer (Alex) at a specified channel and time.

As used in the description and in any claims, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. Various embodiments herein may include interactive posters that involve wireless, e.g., Bluetooth™ and/or NFC, communication aspects, as set forth in more detail further below. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) are within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., FIG. 3-4) and cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeB SD, NetBSD, OpenBSD; (3) Linux; (4) Microsoft Windows; (5) OpenVMS; (6) OS X (Mac OS);

(7) OS/2; (8) Solaris; (9) Tru64 UNIX; (10) VM; (11) Android; (12) Bada; (13) BlackBerry OS; (14) Firefox OS; (15) Ios; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35) .NET Framework; (36) Silverlight; (37) Open Web Platform; (38) Oracle Database; (39) Qt; (40) SAP NetWeaver; (41) Smartface; (42) Vexi; and/OR (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, smart watch, or any other reasonable mobile electronic device.

As used herein, terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

1. A computer-implemented method comprising:
   receiving, by at least one processor, communications associated with a plurality of customers, the communications comprised of customer messages;
   determining a message type, from among a plurality of message types, for each message of the communications,
     wherein the plurality of message types comprises a first message type and a second message type;
   splitting, by the at least one processor, first messages of the first message type into a first set of subcomponent text sections;
   splitting, by the at least one processor, second messages of the second message type into a second set of subcomponent text sections;
   analyzing, by the at least one processor, the first set and the second set to generate a plurality of semantic numerical scores for each respective subcomponent text section, wherein each respective semantic numerical score is based on an evaluation of each respective subcomponent text section in a respective semantic category of a plurality of semantic categories,
     wherein the plurality of the semantic categories comprises at least three semantic categories are selected from a sentiment category, an emotion category, a perceived message type category, a semantic relatedness category, a feeling category, a tone category, a perception category, a micro structure category, and an emotional intelligence category;
   determining, by the at least one processor, at least one impactful semantic category for a target audience by selecting at least one semantic category corresponding to at least one semantic numerical score of at least one subcomponent text section of the first set or the second set that is equal to or higher than a first pre-determined threshold value;
   generating, by the at least one processor, personalized textual content targeting the audience based on at least one unit of text having a corresponding semantic numerical score in the at least one impactful semantic category that is equal to or higher than a second pre-determined threshold value; and generating, by the processor, at least one personalized communication for transmission to the audience from the personalized textual content.
2. The method of clause 1 or of any clause herein, wherein the first message type comprises emails and the second message type comprises SMS messages, push messages, and web banners.
3. The method of clause 1 or of any clause herein, wherein the first set of subcomponent text sections comprises 3 or more parts, including 3 or more of a subject line, a preheader, a banner image, an introductory section, and a call to action.
4. The method of clause 1 or of any clause herein, wherein the first message type comprises email messages, and wherein the first set of subcomponent text sections comprises 3 or more parts, including 3 or more of a subject line, a preheader, a banner image, an introductory section, and a call to action.
5. The method of clause 1 or of any clause herein, wherein the second set of subcomponent text sections comprises 2 or more parts, including 2 or more of an introductory section, a body section, a value proposition, and an end section.
6. The method of clause 1 or of any clause herein, wherein the second message type comprises 2 or more of SMS messages, push messages and/or web banners, and wherein the second set of subcomponent text sections comprises 2 or more parts, including 2 or more of an introductory section, a body section, a value proposition, an end section, and/or entire message.
7. The method of clause 1 or of any clause herein, wherein the sentiment category is comprised of 2 or more subcategories selected from positive, neutral, and negative.
8. The method of clause 1 or of any clause herein, wherein the emotion category is comprised of 3 or more subcategories selected from a group composed of happiness, concern, excitement, sadness, candor and boredom.
9. The method of clause 1 or of any clause herein, wherein the perceived message type category is comprised of 2 or more subcategories selected from a group composed of news, feedback, query, marketing, and spam.
10. The method of clause 1 or of any clause herein, wherein the at least one personalized communication comprises a first portion of the personalized textual content that corresponds to the sentiment category determined to be impactful to the audience, a second portion of the personalized textual content that corresponds to the emotion category determined to be impactful to the audience, and a third portion of the personalized textual content that corresponds to the perceived message type category determined to be impactful to the audience.
11. The method of clause 1 or of any clause herein, wherein the semantic numerical score in the semantic relatedness category is set based on a percentage of the text that is determined to be semantically similar to a benchmark communication.
12. The method of clause 1 or of any clause herein, further comprising:
    building a database of information regarding personalized messages that are impactful to each individual customer, wherein the database is built based on at least one prior personalized message that elicited a response from the individual customer.
13. The method of clause 1 or of any clause herein, further comprising:
    analyzing different textual components or text within at least one region of the at least one personalized communication to determine how the different textual component or text affect the semantic numerical scores; and/or
    changing (rearranging, replacing, deleting) the different textual portions or text within the at least one region of the at least one personalized communication, prior to sending to the audience, to generate a personalized communication that is determined to be potentially impactful to the audience via an increase in the semantic numerical score.
14. A computer-implemented method comprising:
    receiving, by at least one processor, communications associated with a plurality of customers, the communications comprised of customer messages;
    categorizing the customer messages that are emails as a first message type, and categorizing the customer messages that are SMS messages, push messages, and web banners as a second message type;

splitting, by the at least one processor, first messages of the first message type into a first set of subcomponent text sections;

splitting, by the at least one processor, second messages of the second message type into a second set of subcomponent text sections;

analyzing, by the at least one processor, via application of at least one machine learning algorithm, the first set and the second set to generate a plurality of semantic numerical scores for each respective subcomponent text section, wherein each respective semantic numerical score is based on an evaluation of each respective subcomponent text section in a respective semantic category of a plurality of semantic categories, wherein the plurality of the semantic categories comprises at least three semantic categories are selected from a sentiment category, an emotion category, a perceived message type category, a semantic relatedness category, a feeling category, a tone category, a perception category, a micro structure category, and an emotional intelligence category;

determining, by the at least one processor, at least one impactful semantic category for a target audience by selecting at least one semantic category corresponding to at least one semantic numerical score of at least one subcomponent text section of the first set or the second set that is equal to or higher than a first pre-determined threshold value;

generating, by the at least one processor, personalized textual content targeting the audience based on at least one unit of text having a corresponding semantic numerical score in the at least one impactful semantic category that is equal to or higher than a second pre-determined threshold value; and generating, by the processor, at least one personalized communication for transmission to the audience from the personalized textual content.

15. The method of clause 14 or of any clause herein, wherein the first set of subcomponent text sections comprises 3 or more parts, including 3 or more of a subject line, a preheader, a banner image, an introductory section, and a call to action.

16. The method of clause 14 or of any clause herein, wherein the first message type comprises email messages, and wherein the first set of subcomponent text sections comprises 3 or more parts, including 3 or more of a subject line, a preheader, a banner image, an introductory section, and a call to action.

17. The method of clause 14 or of any clause herein, wherein the second set of subcomponent text sections comprises 2 or more parts, including 2 or more of an introductory section, a body section, a value proposition, and an end section.

18. The method of clause 14 or of any clause herein, wherein the second message type comprises 2 or more of SMS messages, push messages and/or web banners, and wherein the second set of subcomponent text sections comprises 2 or more parts, including 2 or more of an introductory section, a body section, a value proposition, an end section, and/or entire message.

19. The method of clause 14 or of any clause herein, wherein the sentiment category is comprised of 2 or more subcategories selected from positive, neutral, and negative.

20. The method of clause 14 or of any clause herein, wherein the emotion category is comprised of 3 or more subcategories selected from a group composed of happiness, concern, excitement, sadness, candor and boredom.

21. The method of clause 14 or of any clause herein, wherein the perceived message type category is comprised of 2 or more subcategories selected from a group composed of news, feedback, query, marketing, and spam.

22. Embodiments herein may also take the form of a system comprised of computing elements that are arranged, programmed and/or otherwise adapted to perform the features and functionality set forth anywhere above.

23. In addition, embodiments herein may also take the form of one or more computer readable media containing computer-executable instructions for performing any of the processing herein, the computer-executable instructions being executable via one or more processing components to process instructions and/or perform one or more aspects of the functionality set forth herein.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A computer-implemented method comprising:

training, by at least one processor, a natural language generation (NLG) machine learning model on customer data derived from a plurality of customers;

receiving, by the at least one processor, communications associated with the plurality of customers, the communications comprised of a plurality of customer messages;

determining, by the at least one processor, a message type, from among a plurality of message types, for each message of the communications, wherein the plurality of message types comprises a first message type and a second message type;

wherein the communications comprise the first messages of the first message type and second messages of the second message type splitting, by the at least one processor, the first messages of the first message type into a first set of subcomponent text sections;

splitting, by the at least one processor, the second messages of the second message type into a second set of subcomponent text sections;

predicting, based on the plurality of customer messages in combination with conversion event data pertaining to the plurality of customer messages, a set of predicted customer preferences for the plurality of customers;

analyzing, by the at least one processor, via the NLG machine learning model, the first set and the second set in combination with the set of predicted customer preferences to generate a plurality of semantic numerical scores comprising a predicted effectiveness for each respective subcomponent text section, wherein each respective semantic numerical score is based on an evaluation of each respective subcomponent text section in a respective semantic category of a plurality of semantic categories and the predicted effectiveness comprises predicted conversion rates for messages that follow the set of predicted customer preferences,
  wherein the plurality of the semantic categories comprises at least three semantic categories are selected from a sentiment category, an emotion category, a perceived message type category, a semantic relatedness category, a feeling category, a tone category, a perception category, a micro structure category, and an emotional intelligence category;
determining, by the at least one processor, at least one impactful semantic category for a target audience by selecting at least one semantic category corresponding to at least one semantic numerical score of at least one subcomponent text section of the first set or the second set that is equal to or higher than a first pre-determined threshold value;
generating, by the at least one processor, via the NLG machine learning model, personalized textual content targeting the audience based on at least one unit of text having a corresponding semantic numerical score in the at least one impactful semantic category that is equal to or higher than a second pre-determined threshold value; and
generating, by the at least one processor, via the NLG machine learning model, at least one personalized communication for transmission to the audience from the personalized textual content; and
updating, by the at least one processor, the NLG machine learning model based on identified interactions between the audience and the personalized communication.

2. The method of claim 1 wherein the first message type comprises emails and the second message type comprises SMS messages, push messages, and web banners.

3. The method of claim 1 wherein the first set of subcomponent text sections comprises 3 or more parts, including 3 or more of a subject line, a preheader, a banner image, an introductory section, and a call to action.

4. The method of claim 1 wherein the first message type comprises email messages, and wherein the first set of subcomponent text sections comprises 3 or more parts, including 3 or more of a subject line, a preheader, a banner image, an introductory section, and a call to action.

5. The method of claim 1 wherein the second set of subcomponent text sections comprises 2 or more parts, including 2 or more of an introductory section, a body section, a value proposition, and an end section.

6. The method of claim 1 wherein the second message type comprises 2 or more of SMS messages, push messages and/or web banners, and wherein the second set of subcomponent text sections comprises 2 or more parts, including 2 or more of an introductory section, a body section, a value proposition, an end section, and/or entire message.

7. The method of claim 1 wherein the sentiment category is comprised of 2 or more subcategories selected from positive, neutral, and negative.

8. The method of claim 1 wherein the emotion category is comprised of 2 or more, subcategories selected from a group composed of happiness, concern, excitement, sadness, candor and boredom.

9. The method of claim 1 wherein the perceived message type category is comprised of 2 or more subcategories selected from a group composed of news, feedback, query, marketing, and spam.

10. The method of claim 1 wherein the at least one personalized communication comprises a first portion of the personalized textual content that corresponds to the sentiment category determined to be impactful to the audience, a second portion of the personalized textual content that corresponds to the emotion category determined to be impactful to the audience, and a third portion of the personalized textual content that corresponds to the perceived message type category determined to be impactful to the audience.

11. The method of claim 1 wherein the semantic numerical score in the semantic relatedness category is set based on a percentage of the text that is determined to be semantically similar to a benchmark communication.

12. The method of claim 1 further comprising:
  building a database of information regarding personalized messages that are impactful to each individual customer, wherein the database is built based on at least one prior personalized message that elicited a response from the individual customer.

13. The method of claim 1 further comprising:
  analyzing different textual components or text within at least one region of the at least one personalized communication to determine how the different textual component or text affect the semantic numerical scores; and/or
  changing the different textual portions or text within the at least one region of the at least one personalized communication, prior to sending to the audience, to generate a personalized communication that is determined to be potentially impactful to the audience via an increase in the semantic numerical score.

14. A computer-implemented method comprising:
  training, by at least one processor, a natural language generation (NLG) machine learning model on customer data derived from a plurality of customers;
  receiving, by the at least one processor, communications associated with the plurality of customers, the communications comprised of customer messages;
  categorizing the customer messages that are emails as a first message type, and categorizing the customer messages that are SMS messages, push messages, and web banners as a second message type;
  splitting, by the at least one processor, first messages of the first message type into a first set of subcomponent text sections;
  splitting, by the at least one processor, second messages of the second message type into a second set of subcomponent text sections;
  predicting, based on the plurality of customer messages in combination with conversion event data pertaining to the plurality of customer messages, a set of predicted customer preferences for the plurality of customers;
  analyzing, by the at least one processor, via the NLG machine learning model, the first set and the second set in combination with the set of predicted customer preferences to generate a plurality of semantic numerical scores comprising a predicted effectiveness for each respective subcomponent text section, wherein each respective semantic numerical score is based on an evaluation of each respective subcomponent text section in a respective semantic category of a plurality of semantic categories and the predicted effectiveness comprises predicted conversion rates for messages that follow the set of predicted customer preferences, wherein the plurality of the semantic categories comprises at least three semantic categories are selected from a sentiment category, an emotion category, a perceived message type category, a semantic relatedness category, a feeling category, a tone category, a perception category, a micro structure category, and an emotional intelligence category;

determining, by the at least one processor, at least one impactful semantic category for a target audience by selecting at least one semantic category corresponding to at least one semantic numerical score of at least one subcomponent text section of the first set or the second set that is equal to or higher than a first pre-determined threshold value;

generating, by the at least one processor, via the NLG machine learning model, personalized textual content targeting the audience based on at least one unit of text having a corresponding semantic numerical score in the at least one impactful semantic category that is equal to or higher than a second pre-determined threshold value;

generating, by the at least one processor, via the NLG machine learning model, at least one personalized communication for transmission to the audience from the personalized textual content; and updating, by the at least one processor, the NLG machine learning model based on identified interactions between the audience and the personalized communication.

15. The method of claim 14 wherein the first set of subcomponent text sections comprises 3 or more parts, including 3 or more of a subject line, a preheader, a banner image, an introductory section, and a call to action.

16. The method of claim 14 wherein the first message type comprises email messages, and wherein the first set of subcomponent text sections comprises 3 or more parts, including 3 or more of a subject line, a preheader, a banner image, an introductory section, and a call to action.

17. The method of claim 14 wherein the second set of subcomponent text sections comprises 2 or more parts, including 2 or more of an introductory section, a body section, a value proposition, and an end section.

18. The method of claim 14 wherein the second message type comprises 2 or more of SMS messages, push messages and/or web banners, and wherein the second set of subcomponent text sections comprises 2 or more parts, including 2 or more of an introductory section, a body section, a value proposition, an end section, and/or entire message.

19. The method of claim 14 wherein the sentiment category is comprised of 2 or more subcategories selected from positive, neutral, and negative.

20. The method of claim 14 wherein the emotion category is comprised of 3 or more subcategories selected from a group composed of happiness, concern, excitement, sadness, candor and boredom.

* * * * *